US011560257B2

(12) United States Patent
Tsui

(10) Patent No.: US 11,560,257 B2
(45) Date of Patent: Jan. 24, 2023

(54) COLLAPSIBLE SHAPE-RETAINING CONTAINERS

(71) Applicant: Sam Tung Tsui, Kowloon (HK)

(72) Inventor: Sam Tung Tsui, Kowloon (HK)

( * ) Notice: Subject to any disclaimer, the term of this patent is extended or adjusted under 35 U.S.C. 154(b) by 0 days.

(21) Appl. No.: 16/806,039

(22) Filed: Mar. 2, 2020

(65) Prior Publication Data

US 2020/0255183 A1 Aug. 13, 2020

Related U.S. Application Data

(62) Division of application No. 15/789,599, filed on Oct. 20, 2017, now abandoned.

(51) Int. Cl.
*B29C 45/14* (2006.01)
*B65D 21/08* (2006.01)
(Continued)

(52) U.S. Cl.
CPC ............ *B65D 21/086* (2013.01); *B29C 45/00* (2013.01); *B29C 45/14* (2013.01); *B29C 70/682* (2013.01);
(Continued)

(58) Field of Classification Search
CPC ... B29C 45/006; B29C 45/0062; B29C 45/04; B29C 45/14; B29C 45/14467; B29C 2045/0067
(Continued)

(56) References Cited

U.S. PATENT DOCUMENTS 1,724,743 A 8/1929 Allen
2,899,110 A 8/1959 Parker
(Continued)

FOREIGN PATENT DOCUMENTS

CN 204527899 U 8/2015
CN 106827381 A 6/2017
(Continued)

OTHER PUBLICATIONS

Normann Copenhagen, Strainer blue, Funnel & Strainer, 6 pages, visited Dec. 19, 2013, available at <http://www_normann-copenhagen.com/products/strainer>.

*Primary Examiner* — Joseph S Del Sole
*Assistant Examiner* — Thu-Khanh T. Nguyen
(74) *Attorney, Agent, or Firm* — Hinshaw & Culbertson LLP

(57) ABSTRACT

Collapsible containers and a method of their manufacture are disclosed herein. The collapsible containers have one or more collapsible wall sections and a stiff upper and lower tier. The wall sections have living hinges and three or more tiers between the hinges. A thermoplastic elastomer layer may join separately made portions of the container together. The containers may be made by molding and overmolding. The containers include inter alia bulk liquid containers, jugs, tubs, baskets, bottles, and food containers. The method of manufacturing includes placing a container component and a matching container body comprising a stiff first tier, a stiff second tier, and a collapsible wall section in a mold; assembling the container body with the container component to close one end of the container body; and overmolding a thermoplastic layer around the container body and the container component.

16 Claims, 37 Drawing Sheets

(51) Int. Cl.
  *B65D 25/42* (2006.01)
  *B65D 45/16* (2006.01)
  *B65D 43/02* (2006.01)
  *B65D 51/24* (2006.01)
  *B29C 70/84* (2006.01)
  *B29D 22/00* (2006.01)
  *B29C 70/68* (2006.01)
  *B65D 47/32* (2006.01)
  *B29C 45/00* (2006.01)
  *B29K 101/12* (2006.01)
  *B29L 31/00* (2006.01)

(52) U.S. Cl.
  CPC ............ *B29C 70/84* (2013.01); *B29D 22/003* (2013.01); *B65D 25/42* (2013.01); *B65D 43/02* (2013.01); *B65D 45/16* (2013.01); *B65D 47/32* (2013.01); *B65D 51/242* (2013.01); *B29K 2101/12* (2013.01); *B29L 2031/712* (2013.01)

(58) Field of Classification Search
  USPC ........................................................ 425/190
  See application file for complete search history.

(56) References Cited

U.S. PATENT DOCUMENTS

| | | | |
|---|---|---|---|
| 4,092,519 | A | 5/1978 | Eaton-Williams |
| 4,492,313 | A | 1/1985 | Touzani |
| RE32,379 | E | 3/1987 | Touzani |
| 5,310,068 | A | 5/1994 | Saghri |
| 5,384,138 | A | 1/1995 | Robbins, III et al. |
| 5,900,293 | A | 5/1999 | Zettle |
| 6,354,456 | B2 | 3/2002 | Rapson |
| 6,705,471 | B2 | 3/2004 | Kataoka |
| 6,736,285 | B2 | 5/2004 | Stewart-Stand |
| D574,673 | S | 8/2008 | Tsui |
| 7,654,402 | B2 | 2/2010 | Kusuma et al. |
| 7,678,271 | B2 | 3/2010 | Curtin |
| D615,826 | S | 5/2010 | Tsui |
| 7,819,263 | B1 | 10/2010 | DiCarlo-Nelson |
| D656,800 | S | 4/2012 | Lee et al. |
| D658,949 | S | 5/2012 | Tsui |
| 8,215,230 | B2 | 7/2012 | Curtin |
| D692,715 | S | 11/2013 | Tsui |
| 8,887,942 | B2 | 11/2014 | Miksovsky et al. |
| D724,905 | S | 3/2015 | Tsui |
| 9,044,082 | B2 | 6/2015 | Kusuma et al. |
| D749,373 | S | 2/2016 | Tsui |
| D777,520 | S | 1/2017 | Singlaub |
| D779,886 | S | 2/2017 | Singlaub |
| 9,969,521 | B2 | 5/2018 | Shen |
| 2005/0127074 | A1 | 6/2005 | Kusuma |
| 2006/0096929 | A1 | 5/2006 | Repp et al. |
| 2006/0151909 | A1* | 7/2006 | Kalemba ............ B29C 45/0081 264/242 |
| 2007/0023439 | A1 | 2/2007 | Vaughn |
| 2007/0290466 | A1 | 12/2007 | Lenz |
| 2009/0032153 | A1 | 2/2009 | Burnett |
| 2009/0050429 | A1 | 2/2009 | Adams, Jr. |
| 2010/0072166 | A1 | 3/2010 | Dickie |
| 2011/0036806 | A1 | 2/2011 | Gregg et al. |
| 2011/0248037 | A1 | 10/2011 | Fung |
| 2011/0272419 | A1 | 11/2011 | Vanderberg et al. |
| 2012/0205371 | A1 | 8/2012 | Lee |
| 2013/0032592 | A1 | 2/2013 | Lee |
| 2013/0075393 | A1 | 3/2013 | Haynie |
| 2013/0206800 | A1 | 8/2013 | Simonsen |
| 2013/0277364 | A1 | 10/2013 | Kusuma |
| 2014/0103005 | A1* | 4/2014 | Cerveny ............. B29C 45/0017 425/542 |
| 2014/0174963 | A1 | 6/2014 | Bechyne |
| 2015/0251795 | A1 | 9/2015 | Tsui |
| 2015/0251808 | A1* | 9/2015 | Tsui ........................ B29C 65/48 211/41.6 |
| 2015/0291309 | A1 | 10/2015 | McGregor |
| 2016/0347503 | A1 | 12/2016 | Tsui |

FOREIGN PATENT DOCUMENTS

| | | |
|---|---|---|
| CN | 206880538 U | 1/2018 |
| CN | 207477319 U | 6/2018 |
| DE | 202015102788 U1 | 7/2015 |
| WO | 2017052475 A1 | 3/2017 |

\* cited by examiner

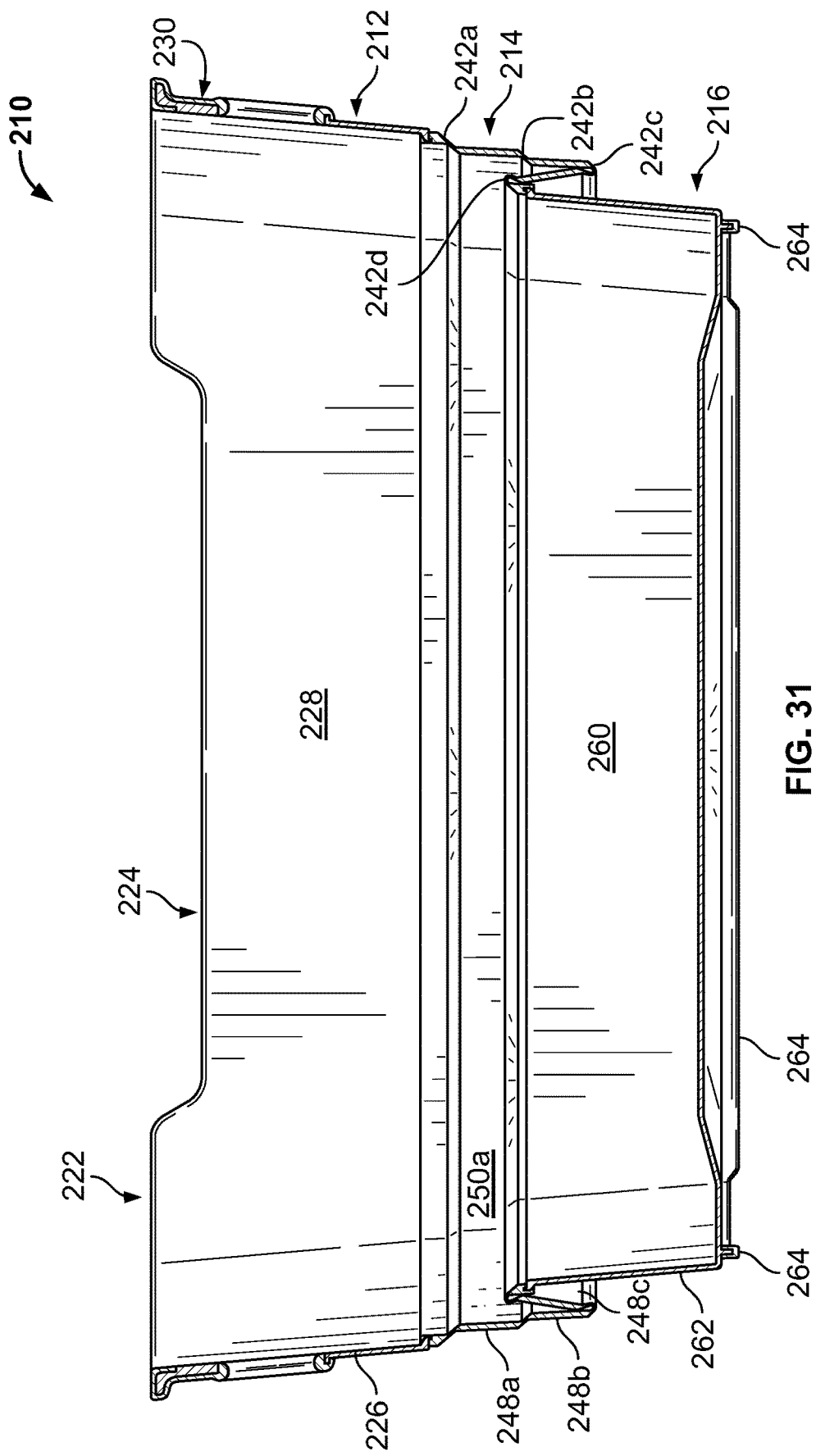

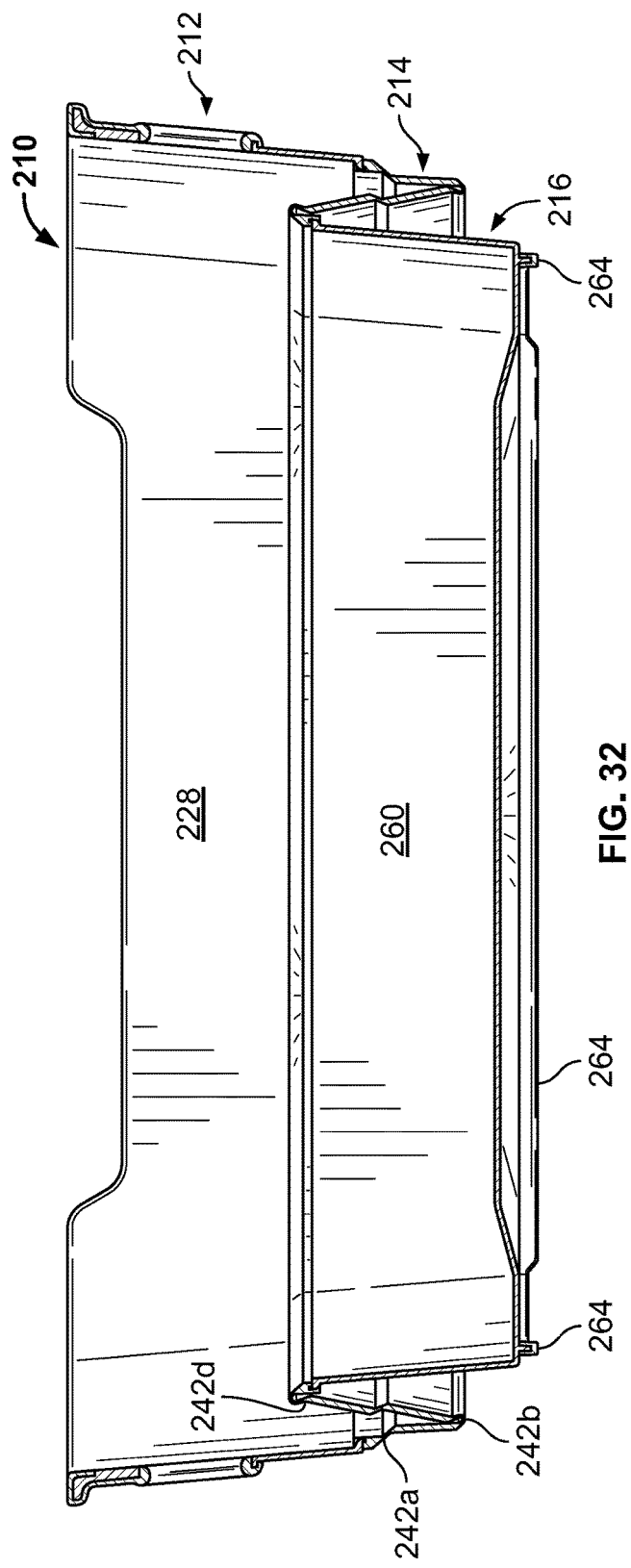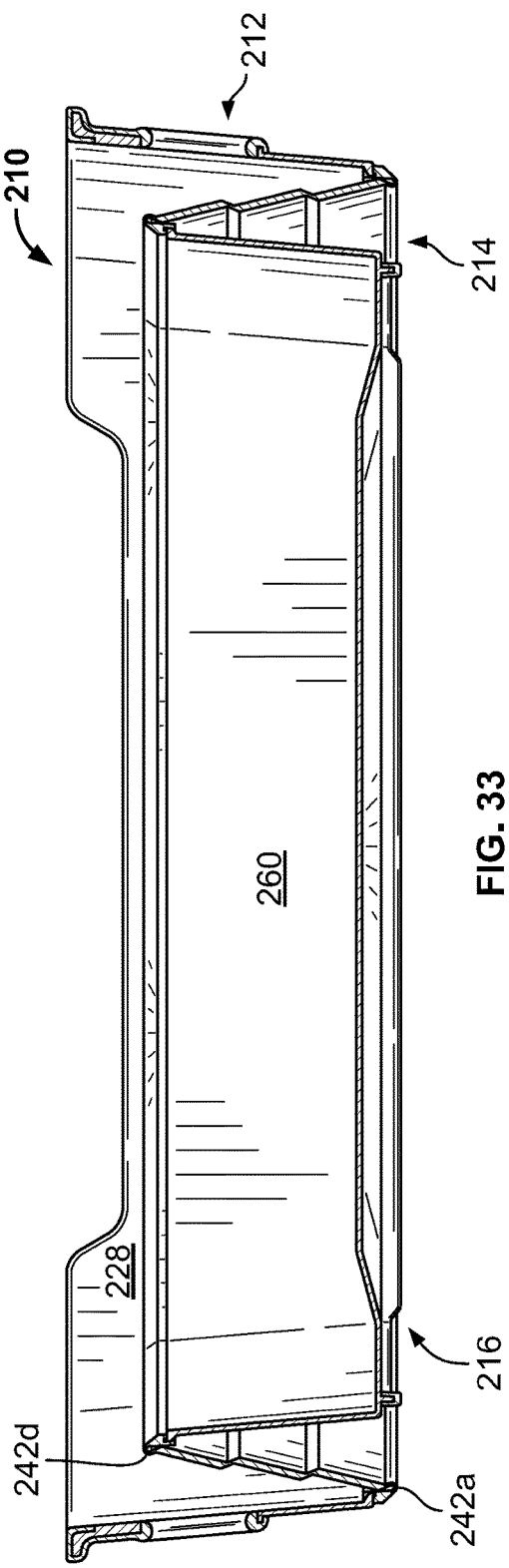

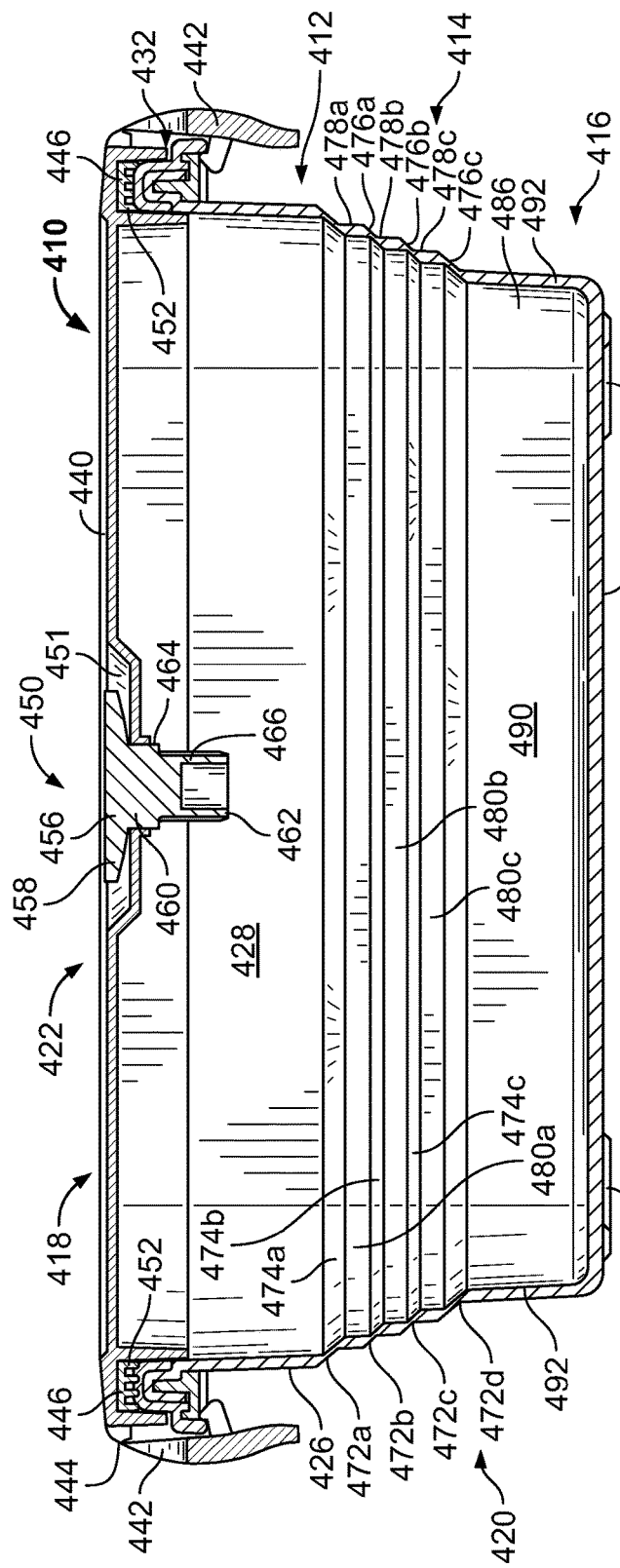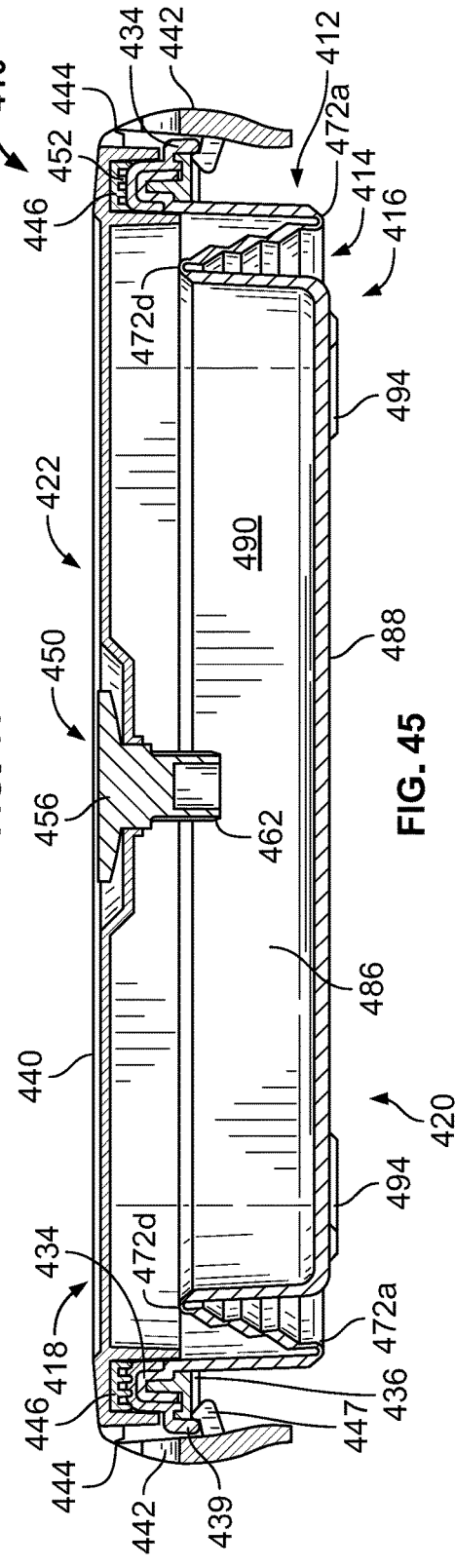

COLLAPSIBLE SHAPE-RETAINING CONTAINERS

CROSS REFERENCE TO RELATED APPLICATION

This application is a divisional of U.S. application Ser. No. 15/789,599, filed Oct. 20, 2017, the entire disclosure of which is incorporated herein by reference.

FIELD OF THE INVENTION

The present invention relates to shape-retaining collapsible containers. More particularly, a collapsible container for holding bulk liquid, a collapsible bottle, a collapsible tub, a collapsible basket and a collapsible food container are provided.

BACKGROUND

To have a large capacity, containers necessarily must be large. However, when such containers are not in use, such containers unnecessarily occupy a large volume. Hence, a need exists for containers that can be stored in a compact configuration when empty.

Containers that are in use often have excess capacity relative to the volume actually being used inside the containers. These containers may then occupy an excessive amount of space while in use. Consequently, a need exists for containers whose size and capacity can be altered to better match the volume of their contents.

Various types of capacity adjustable containers are known in the art, but they have numerous drawbacks. In particular, it has been found that these containers may be difficult to expand or collapse, particularly if they are large. Also, it has been found that these containers may not collapse or expand uniformly and easily, particularly if they have corners. Therefore, a need also exists for capacity adjustable containers that readily and easily expand and collapse uniformly and easily.

Another drawback of past capacity adjustable containers is that they are difficult to make watertight cost-effectively when they have to be made from two or more separate pieces. Accordingly, a need also exists for cost-effective watertight capacity-adjustable containers made from separate parts.

Capacity adjustable containers often have less capacity than the equivalent non-adjustable container. A need exists for capacity adjustable containers of the same or similar capacity when expanded compared to non-adjustable containers.

SUMMARY OF THE INVENTION

Various types of collapsible containers are provided in accordance with the present invention. In one embodiment, the collapsible container has a generally annular, stiff upper tier and an opening in an upper portion of the upper tier, a stiff lower tier, and a collapsible wall section connected to the upper tier and the lower tier. The collapsible wall section has at least first, second and third generally annular collapsible wall section tiers. The collapsible wall section also has an upper living hinge adjacent the lower edge of the upper tier, a lower living hinge adjacent the upper edge of the lower tier, and at least two intermediate living hinges. The first and second collapsible wall section tiers are connected to each other by one of the intermediate living hinges. The second and third collapsible wall section tiers are connected to each other by the other of the intermediate living hinges. The first tier is located above the second tier and the second tier is located above the third tier. The size of the container volume can be increased by unfolding the collapsible wall section from a collapsed configuration to an expanded configuration and can be decreased by folding the collapsible wall section from the expanded configuration to the collapsed configuration. The collapsible wall section is at least partially located within one of the upper and lower tiers and the other of the upper and lower tiers is at least partially located within the collapsible wall section when the collapsible wall section is in the collapsed configuration.

In one aspect of the invention, the second tier is adjacent the first and third tiers. Additionally, the first and third tiers are flexible and the second tier is stiff. In the collapsed state, the collapsible wall section is folded along the living hinge between the first and second tiers and along the living hinge between the second and third tiers.

In another aspect of the invention, in the collapsed state, the collapsible wall section is folded along the upper living hinge and along the lower living hinge.

In another aspect of the invention, the first, second and third tiers are substantially vertical in the expanded configuration and in the collapsed configuration.

In still another aspect of the invention, the lower tier has a generally annular first portion and a second portion. The first and second portions are secured together by an overmolded thermoplastic layer at least partially covering the first and second portions. Preferably, one of the first and second portions has a female member, the other of the first and second portions has a corresponding male member, and the male member is inserted in the female member. Preferably, the lower tier has an interior wall exposed to the interior of the container and the interior wall includes at least a portion of the male member.

Typically, the second portion has an imperforate base. The collapsible container may have a faucet and a faucet passageway through the lower section through which the faucet extends, for use as a beverage container or water jug, for example.

The second portion may be generally annular. Typically, the container also has a bottom tier below the lower tier and a second collapsible wall section connected to the lower tier and the bottom tier. The second collapsible wall section has at least fourth, fifth and sixth generally annular collapsible wall section tiers, a second upper living hinge adjacent the lower edge of the lower tier, a second lower living hinge adjacent the upper edge of the bottom tier, and at least two intermediate living hinges. The fourth and fifth collapsible wall section tiers are connected to each other by one of the intermediate living hinges. The fifth and sixth collapsible wall section tiers are connected to each other by the other of the intermediate living hinges. The fourth tier is located above the fifth tier and the fifth tier is located above the sixth tier. The size of the container volume can be increased by unfolding the second collapsible wall section from a second collapsed configuration to a second expanded configuration and can be decreased by folding the second collapsible wall section from the second expanded configuration to the second collapsed configuration. The second collapsible wall section is at least partially located within one of the lower and bottom tiers and the other of the lower and bottom tiers is at least partially located within the second collapsible wall section when the second collapsible wall section is in the second collapsed configuration.

In another aspect of the invention, the second portion is generally annular. Typically, the container also has a bottom tier below the lower tier and a second collapsible wall section connected to the lower tier and the bottom tier. The second collapsible wall section has at least fourth, fifth and sixth generally annular collapsible wall section tiers, a second upper living hinge adjacent the lower edge of the lower tier, a second lower living hinge adjacent the upper edge of the bottom tier, and at least two intermediate living hinges. The fourth and fifth collapsible wall section tiers are connected to each other by one of the intermediate living hinges. The fifth and sixth collapsible wall section tiers are connected to each other by the other of the intermediate living hinges. The fourth tier is located above the fifth tier and the fifth tier is located above the sixth tier. The size of the container volume can be increased by unfolding the second collapsible wall section from a second collapsed configuration to a second expanded configuration and can be decreased by folding the second collapsible wall section from the second expanded configuration to the second collapsed configuration. The second collapsible wall section is at least partially located within one of the lower and bottom tiers and the other of the lower and bottom tiers is at least partially located within the second collapsible wall section when the second collapsible wall section is in the second collapsed configuration.

In another aspect of the invention, the collapsible container also has a rim having an underside, a flexible rim component and a rigid rim underside component. Typically, the container also has a lid having a plurality of peripheral flaps for securing the lid to the container. Typically, the upper tier, lower tier, collapsible wall section and the flexible rim component are made of an elastomer and the flexible rim component is connected to the upper tier. More preferably, the flexible rim component is directly connected to the upper tier. The rigid rim underside component may be made of a non-elastomeric plastic. Each of the peripheral flaps may have a hook for securing the lid to the container and each flap is adjustable from a hooked position in which the hook is hooked to the underside of the rim to an unhooked position.

In another aspect of the invention, the collapsible container also has a flexible spout having a spout living hinge. The spout is foldable downwardly along the spout living hinge. The spout is thereby at least partially located within the lower tier when the lower tiers and pour spout are in the collapsed configuration.

In another aspect of the invention, the container has a removable lid covering and securable over the opening. Preferably; the lid includes a plurality of peripheral flaps for securing the lid to the container. Preferably, the lid has a selectively openable vent. Preferably, the collapsible container is watertight when the removable lid is secured over the opening.

In another aspect of the invention, the container has a plurality of apertures.

In another aspect of the invention, the container has a handle that is attached to the upper tier.

In yet another aspect of the invention, the container volume is defined by the upper and lower tiers and the collapsible wall section.

In another aspect of the invention, the opening is configured to be opened and closed to selectively allow and restrict the flow of fluid into and out of the container body through the top opening.

In still another embodiment, a method of manufacturing a collapsible container is provided. The method includes placing a container body comprising a stiff first tier, a stiff second tier, and a collapsible wall section in a mold; assembling the container body with a matching container component to close one end of the container body; placing the container component in the mold; and overmolding a thermoplastic layer around at least a portion of the container body and around at least a portion of the container component in the mold to join the container body and the container component. Preferably; the joining is permanent. The assembly may occur inside or outside of the mold.

In another aspect of the invention, the method also includes collapsing the collapsible wall section to collapse the container body before overmolding. The overmolding occurs on the collapsed container body.

In another aspect of the invention, the method also includes forming the collapsible wall section with a plurality of circumferential wall sections and a plurality of circumferential lines of thinned material for living hinges between the circumferential wall sections.

In another aspect of the invention, the method also includes overmolding the collapsible wall section onto the first tier and the second tier.

BRIEF DESCRIPTION OF THE DRAWINGS

FIG. 21A is an enlarged cutaway side elevation view of a portion of FIG. 21 as indicated in FIG. 21.

FIG. 31 is a cross-sectional view taken along line 31-31 of FIG. 29 of the collapsible container depicted in FIG. 26 in a first partially collapsed state, FIG. 32 is a cross-sectional view taken along line 32-32 of FIG. 29 of the collapsible container depicted in FIG. 26 in a second partially collapsed state, more collapsed than the first.

FIG. 33 is a cross-sectional view taken along line 3-3 of FIG. 29 of the collapsible container depicted in FIG. 26 in a fully collapsed state.

FIG. 44 is a cross-sectional view taken on line 44-44 in FIG. 40.

FIG. 45 is a cross-sectional view taken on line 45-45 of the collapsible container of FIG. 40 in a fully collapsed state.

DETAILED DESCRIPTION OF THE INVENTION

Figure 1:
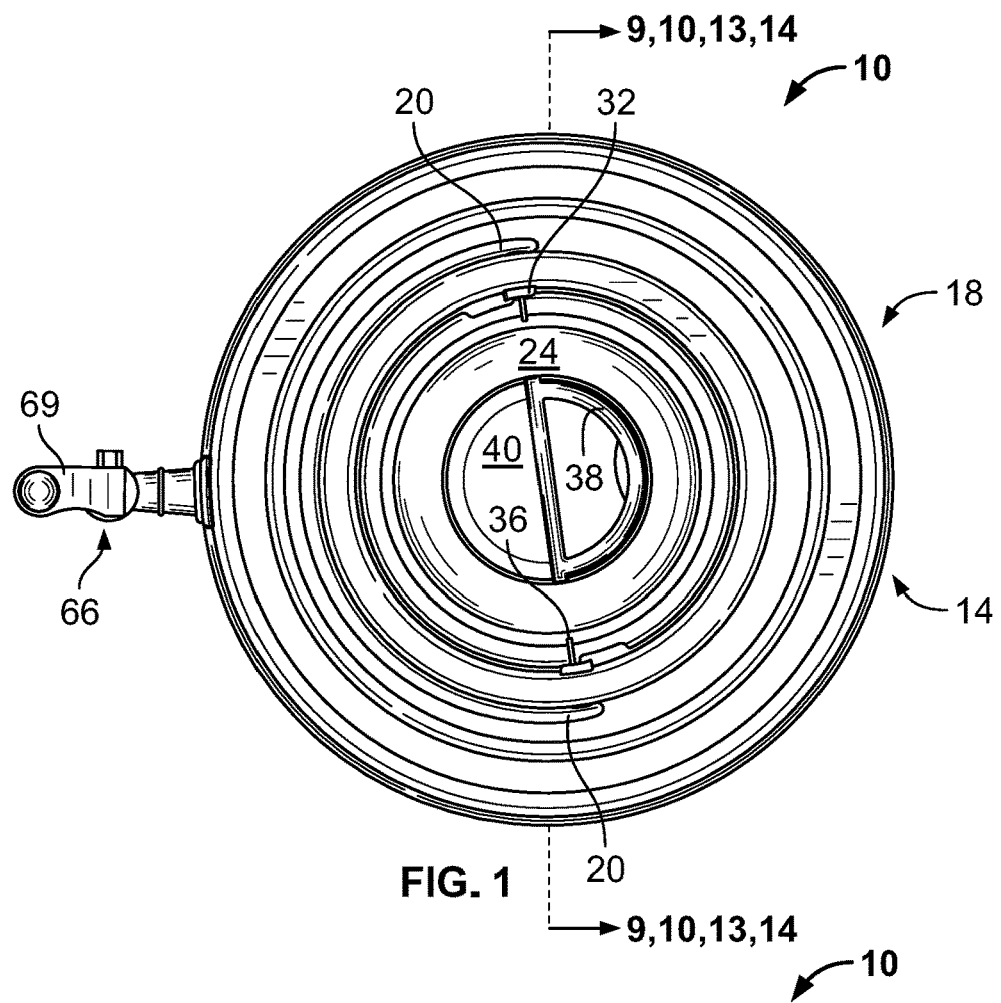
FIG. 1 is top plan view of a collapsible bulk liquid container in a fully expanded state according to an embodiment of the invention.
Figure 2:
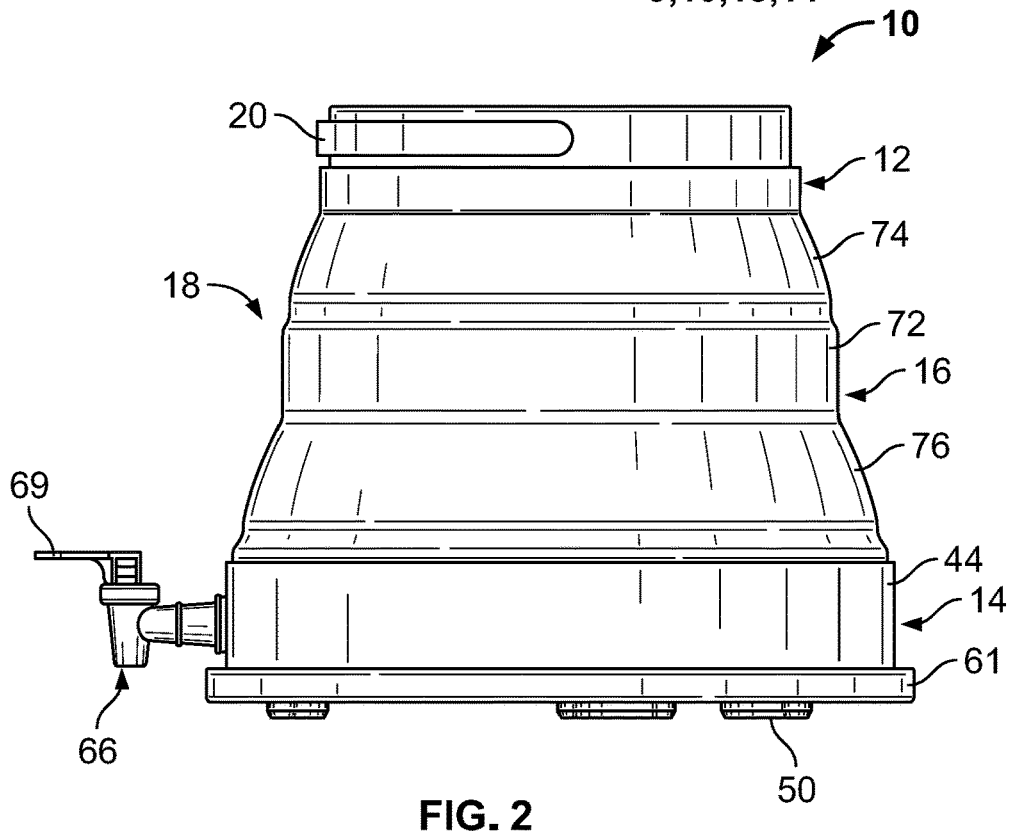
FIG. 2 is a side elevation view of the collapsible container depicted in FIG. 1.

Collapsible containers in accordance with the present invention are described in detail herein.

Referring to the Figures generally, a collapsible bulk liquid container 10 is depicted in FIGS. 1-14, a collapsible bottle 110 is depicted in FIGS. 15-25, a collapsible tub 210 is depicted in FIGS. 26-33, a collapsible basket 310 is depicted in FIGS. 34-39, and a collapsible food container 410 is depicted in FIGS. 40-47.

Referring to FIGS. 1-14, bulk liquid container 10, generally in the form of a jug, is especially suited for containing water or other beverages or liquids, is illustrated as a multi-tiered container including a stiff or rigid upper tier 12 (sometimes described herein as top tier 12), a stiff or rigid lower tier 14 (sometimes described herein as bottom tier 14, and a collapsible wall section 16 connecting upper tier 12 to lower tier 14. Tier 12, tier 14 and collapsible wall section 16 combine to form a container shell 18.

Top tier 12 has a handle 20, a top opening 22 (sometimes described herein as opening 22 or main opening 22), and a lid 24. Handle 20 may be pivotably connected to top tier 12 by means of male members received in openings in top tier 12. Main opening 22 has a rim 30 that is located below the top of tier 12. Rim 30 may have one or more drainage channels (not shown).

Figure 3:
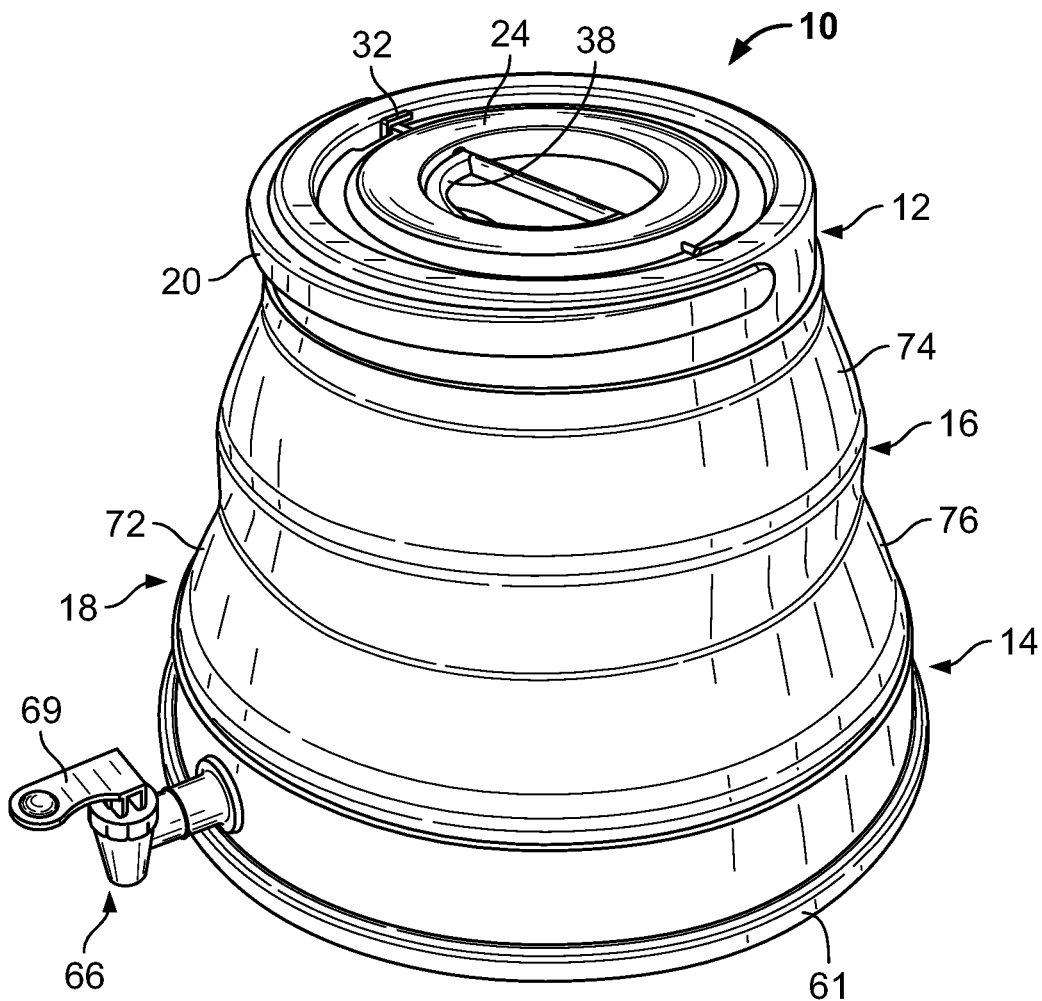
FIG. 3 is a perspective view of the collapsible container depicted in FIG. 1 with a handle moved to another position.
Figure 4:
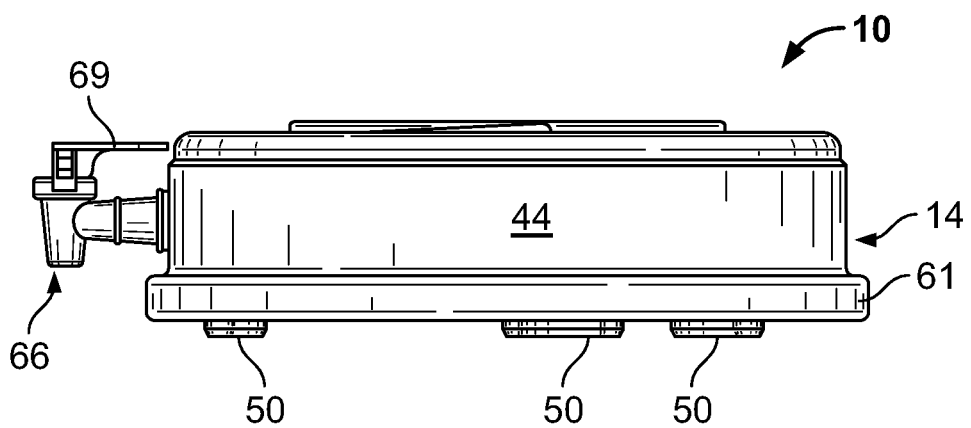
FIG. 4 is a side elevation view of the collapsible container depicted in FIG. 1 in a fully collapsed state.
Figure 5:
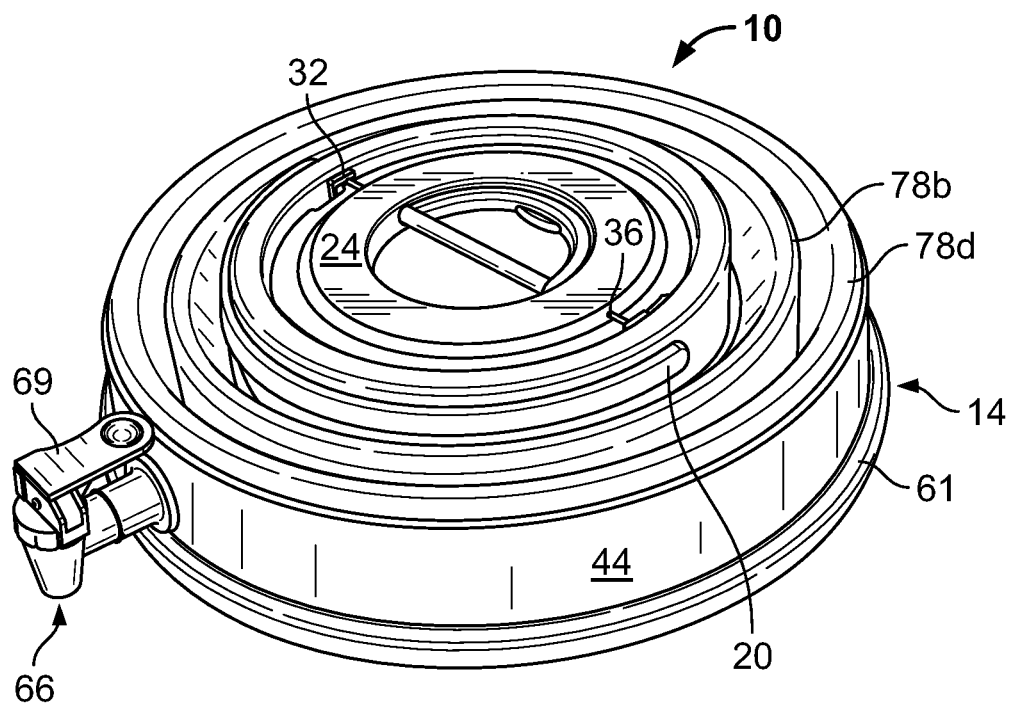
FIG. 5 is a perspective view of the collapsible container depicted in FIG. 1 in a fully collapsed state.
Figure 6:
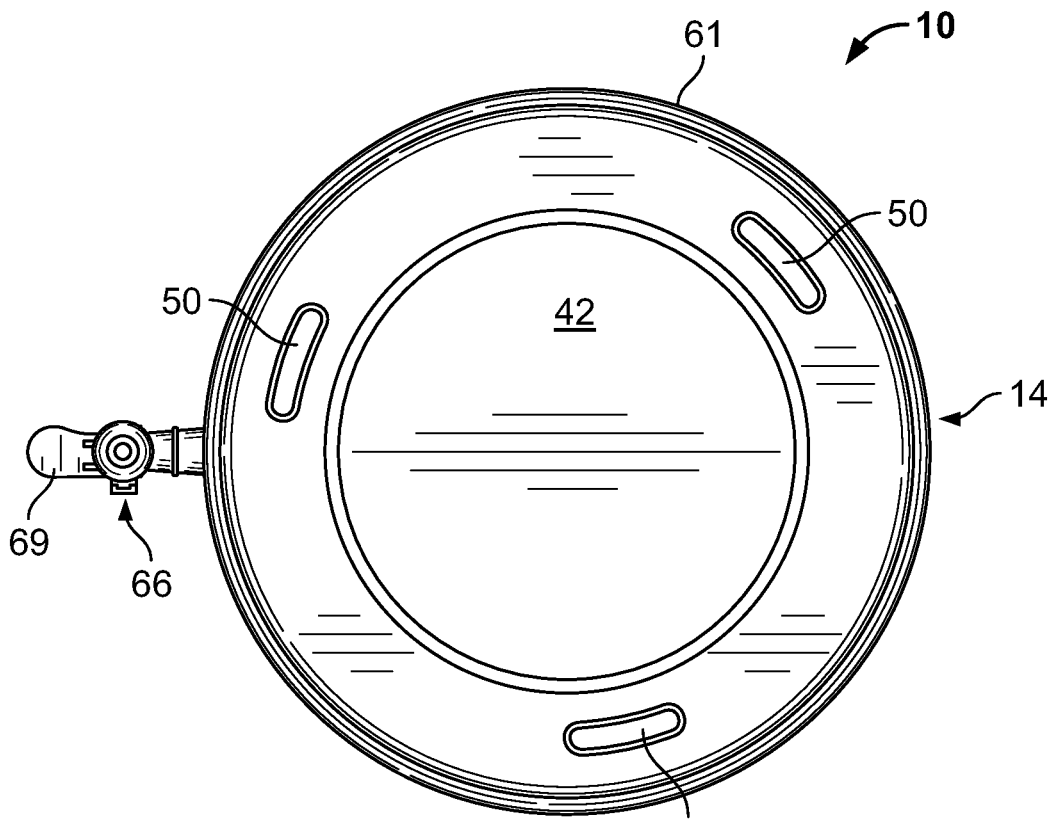
FIG. 6 is a bottom plan view of the collapsible container depicted in FIG. 1.
Figure 7:
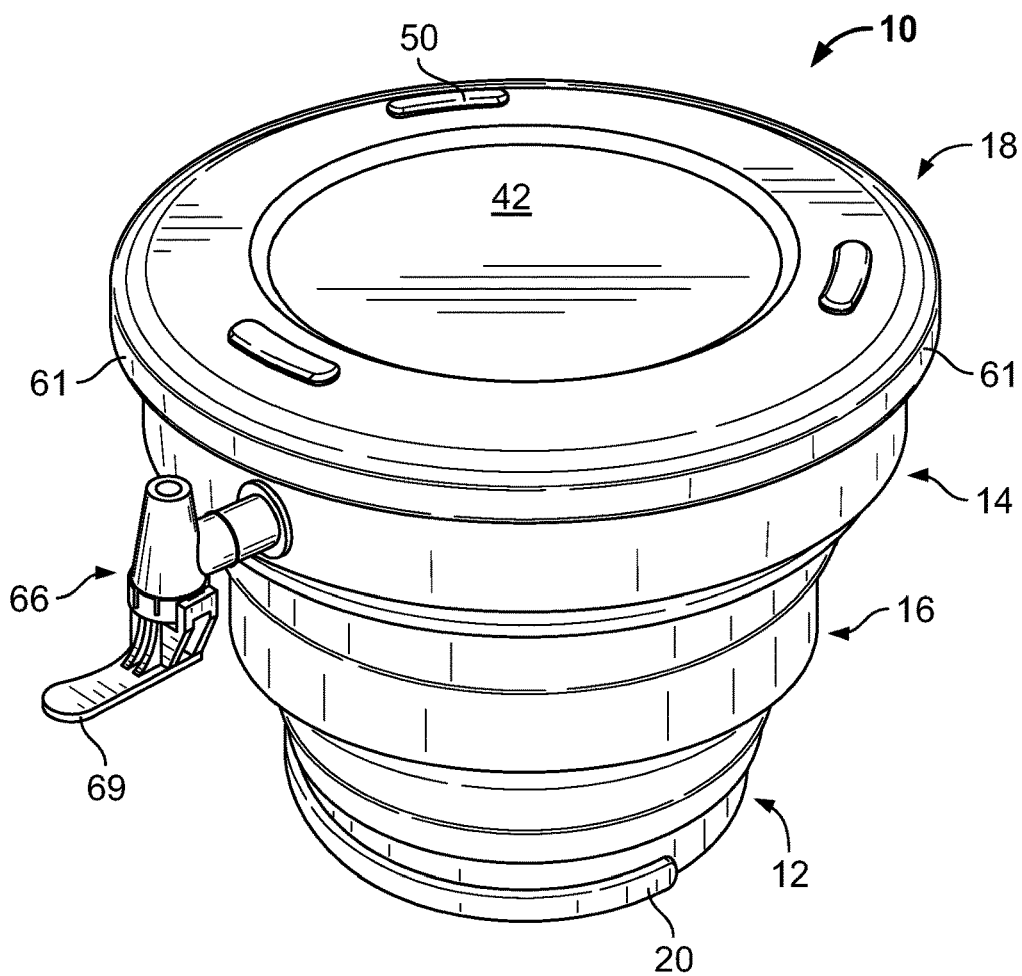
FIG. 7 is an inverted perspective view of the collapsible container depicted in FIG. 1.
Figure 8:
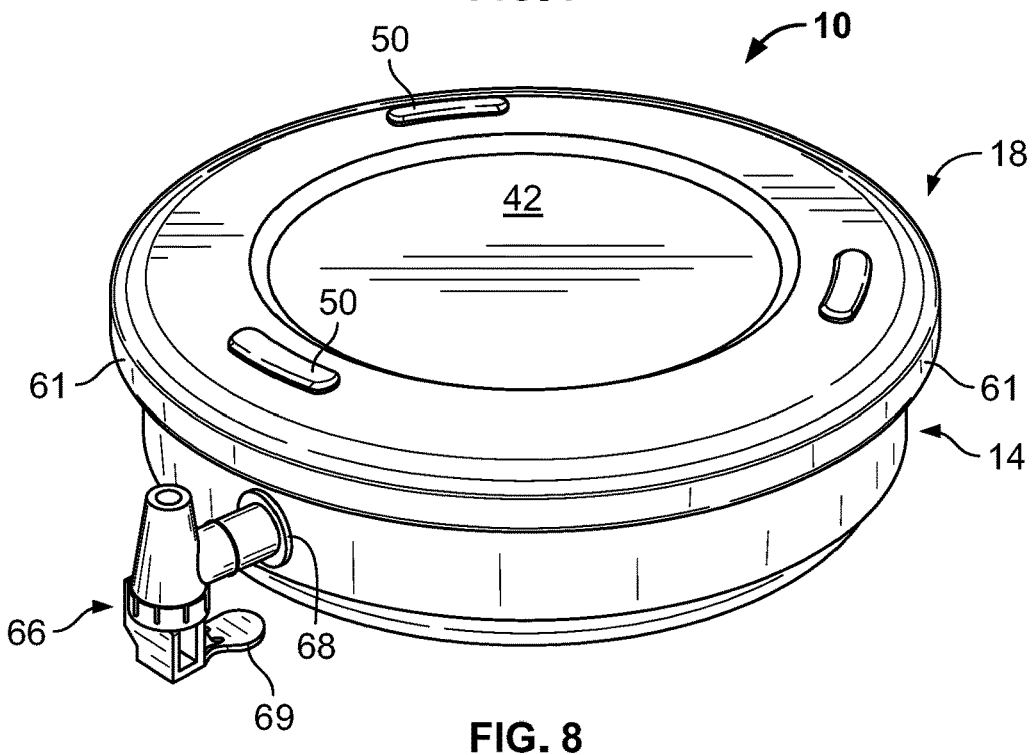
FIG. 8 is an inverted perspective view of the collapsible container depicted in FIG. 1 in a fully collapsed state.
Figure 8A:
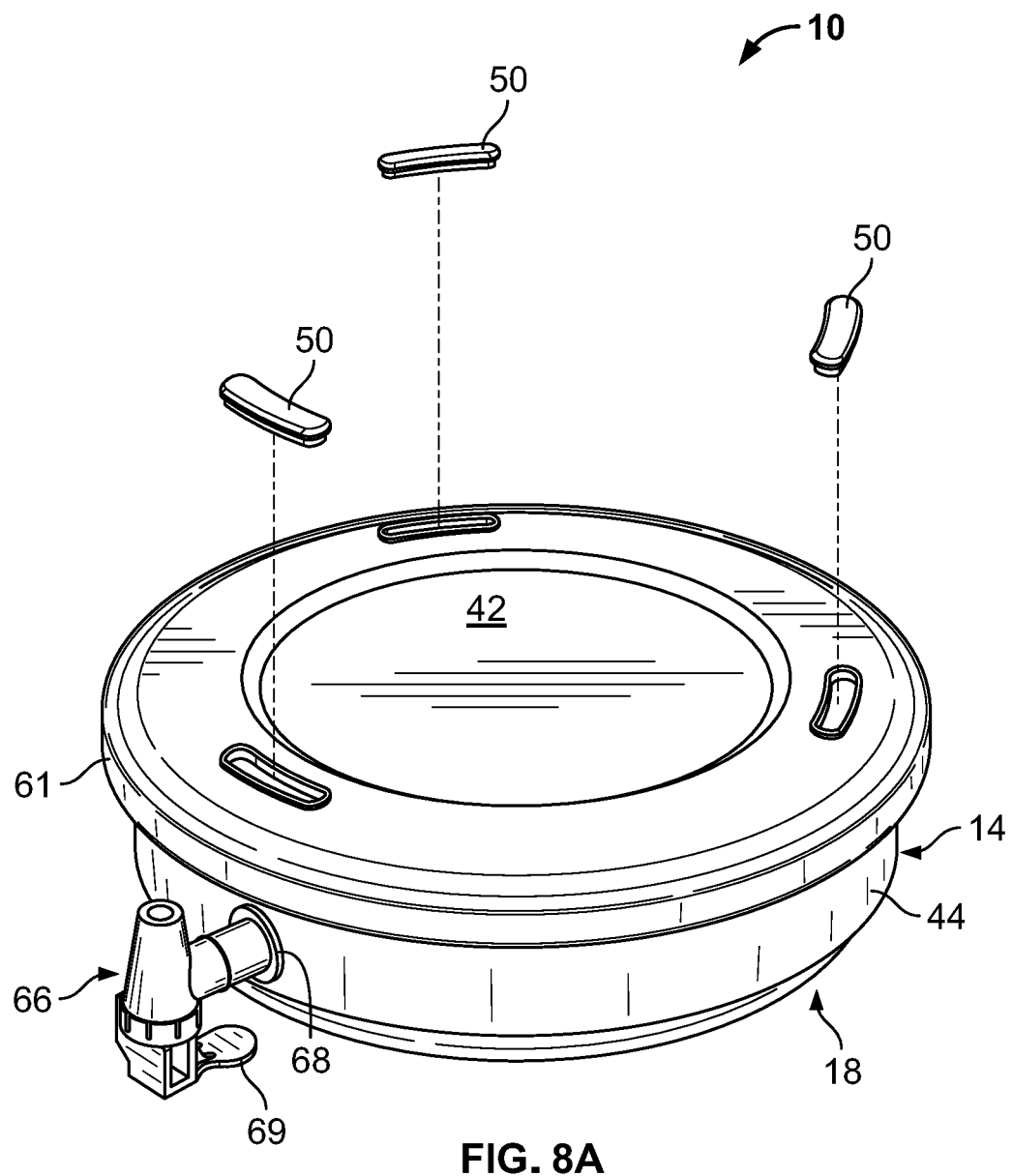
FIG. 8A is an exploded view of the bottom of the collapsible container depicted in FIG. 1.
Figure 9:
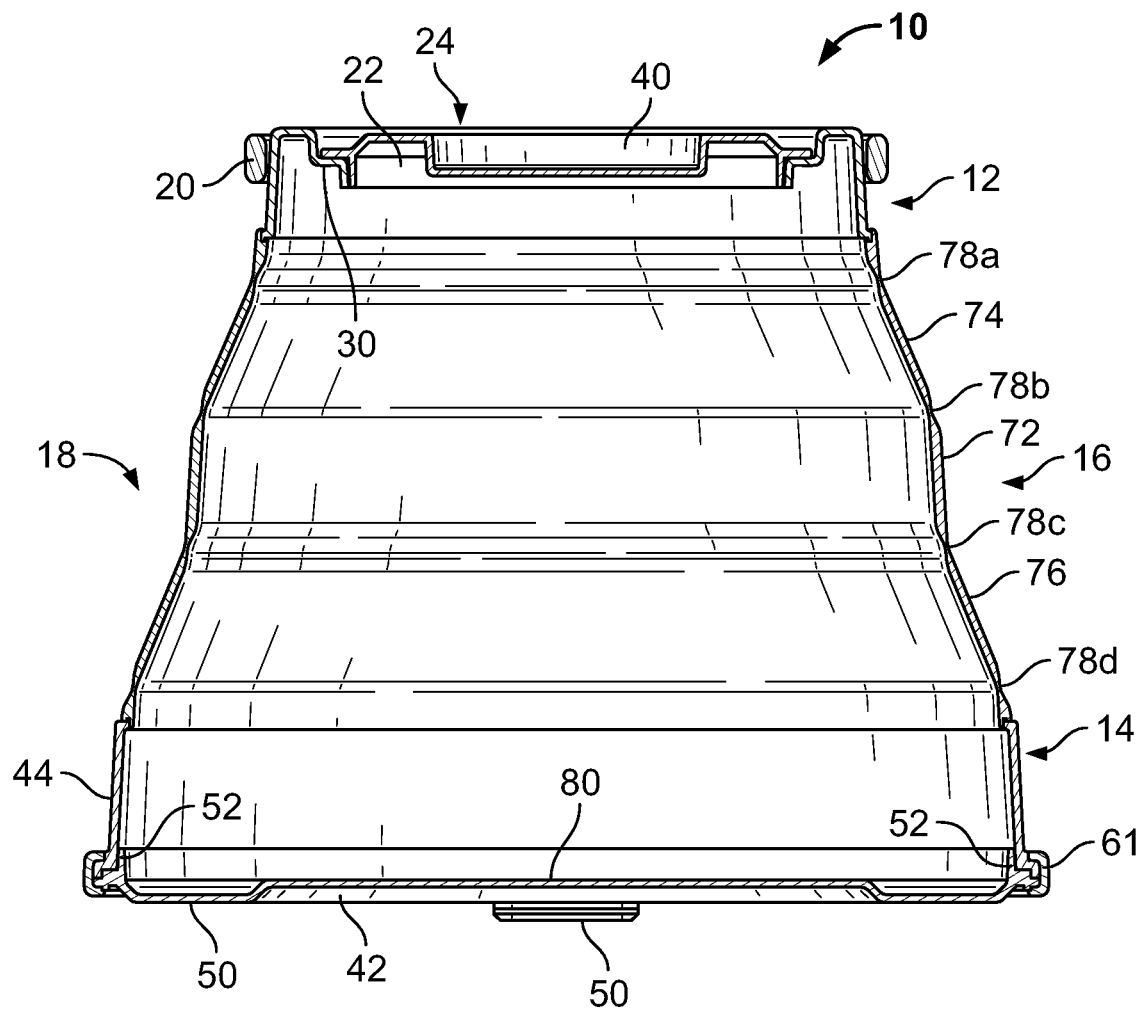
FIG. 9 is a front sectional view taken on line 9-9 of FIG. 1.
Figure 10:
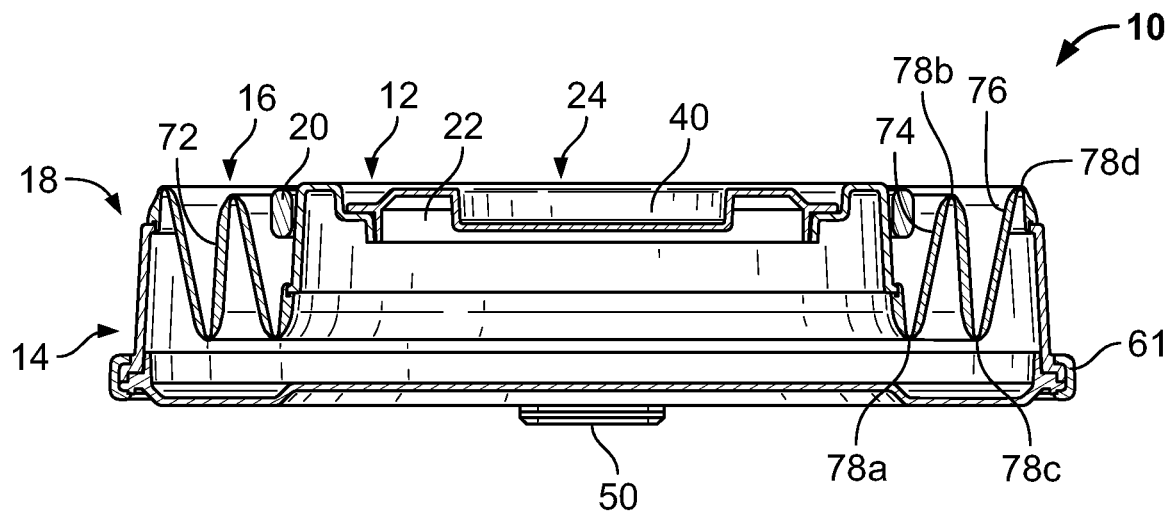
FIG. 10 is a front sectional elevation view taken on line 10-10 of FIG. 1 of the container of FIG. 1 in a fully collapsed position.
Figure 12:
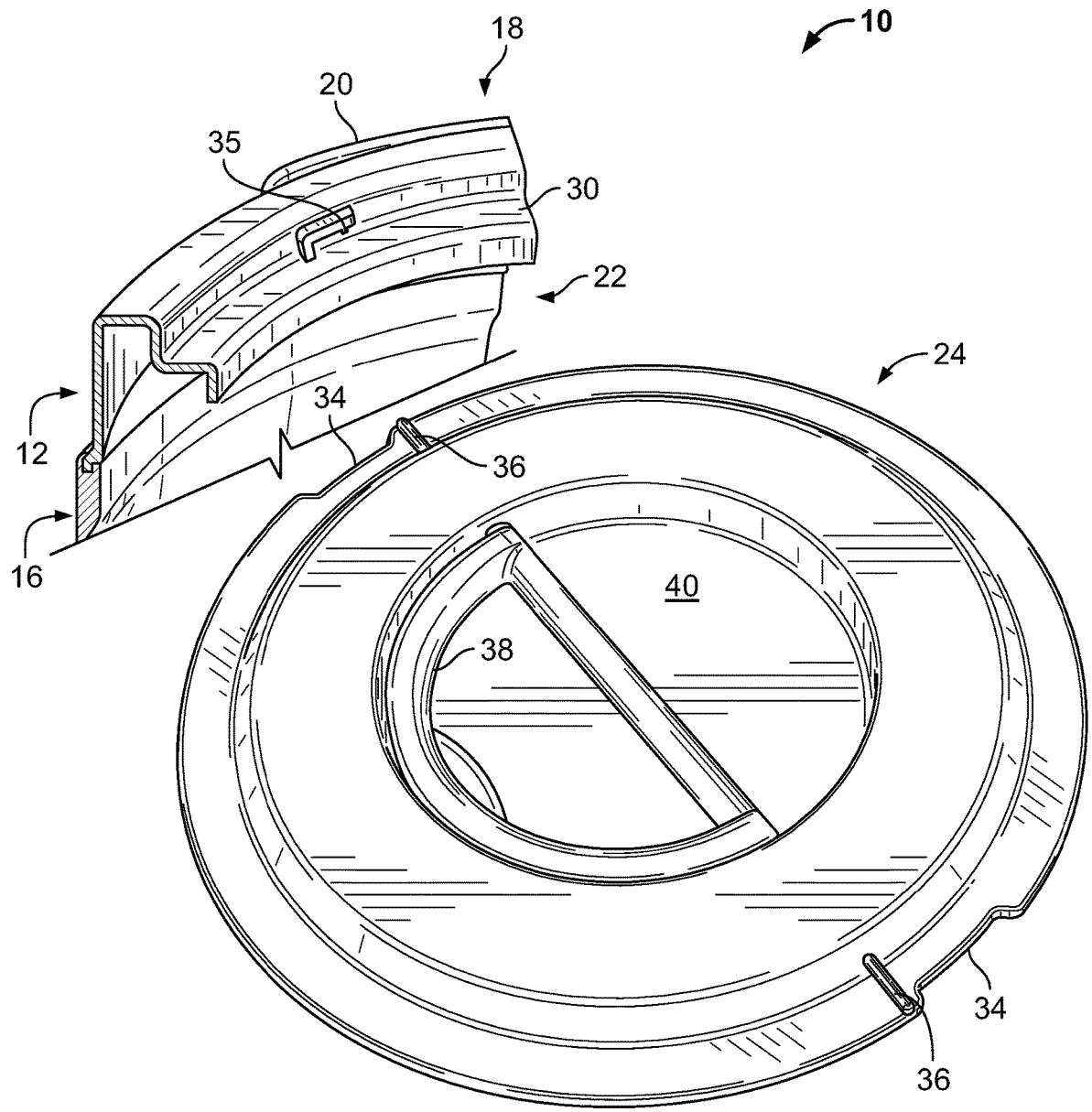
FIG. 12 is a perspective view of the container lid together with a fragmentary view of a portion of the collapsible container shown in FIG. 1.
Figure 13:
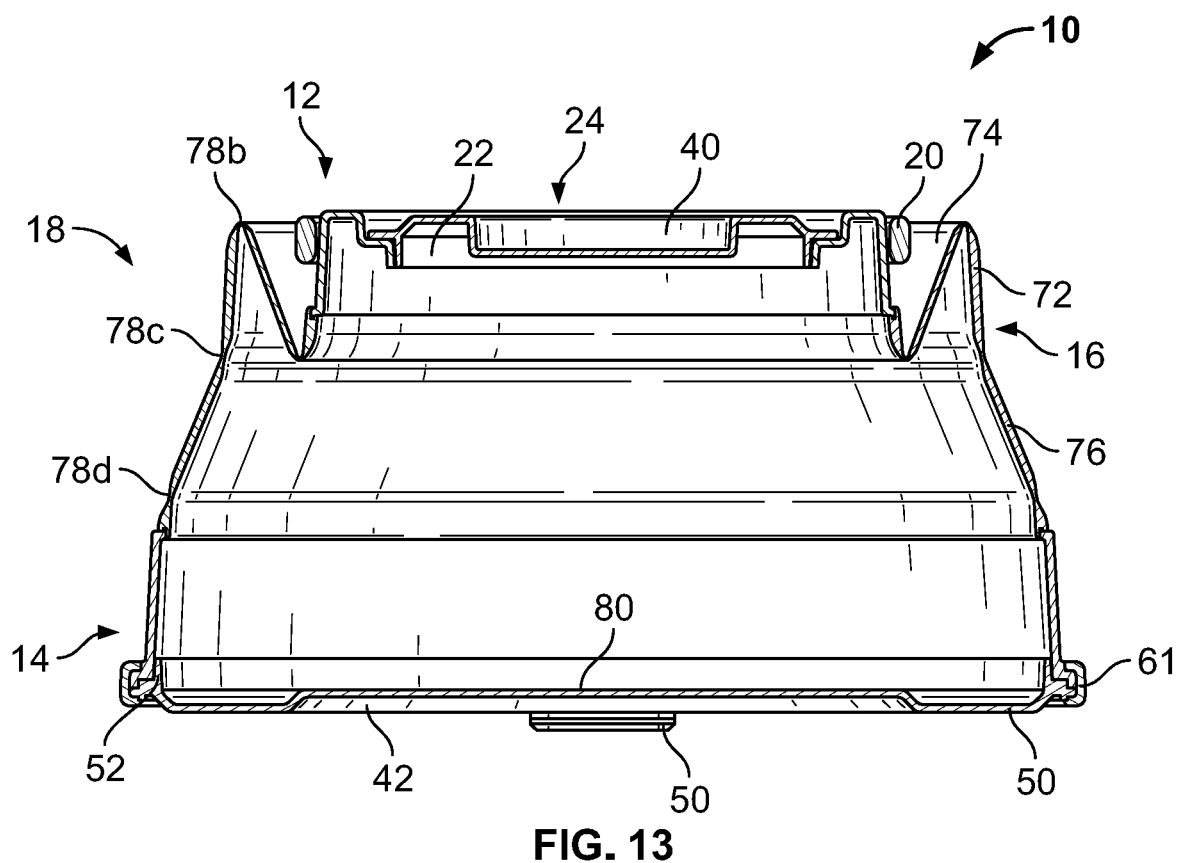
FIG. 13 is a front sectional elevation view taken on line 13-13 of FIG. 1 of the container of FIG. 1 in a first partially collapsed state.
Figure 14:
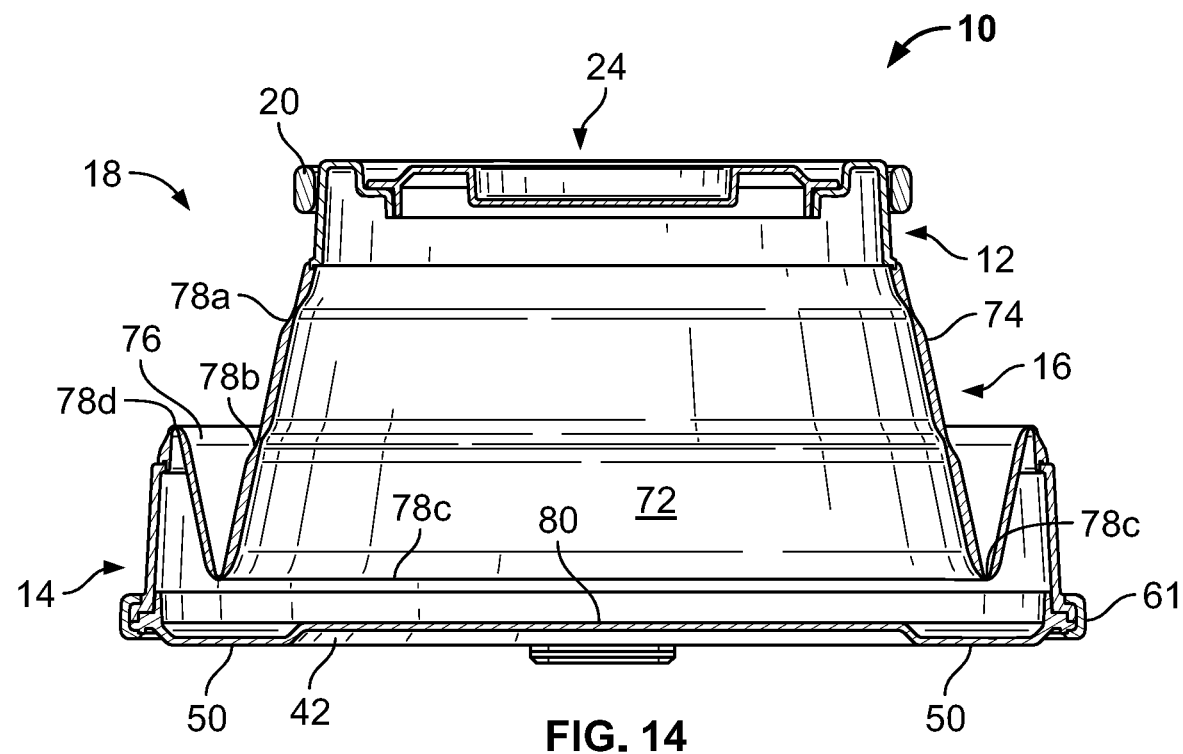
FIG. 14 is a front sectional elevation view taken on line 14-14 of FIG. 1 of the container of FIG. 1 in a second partially collapsed state.
Figure 15:
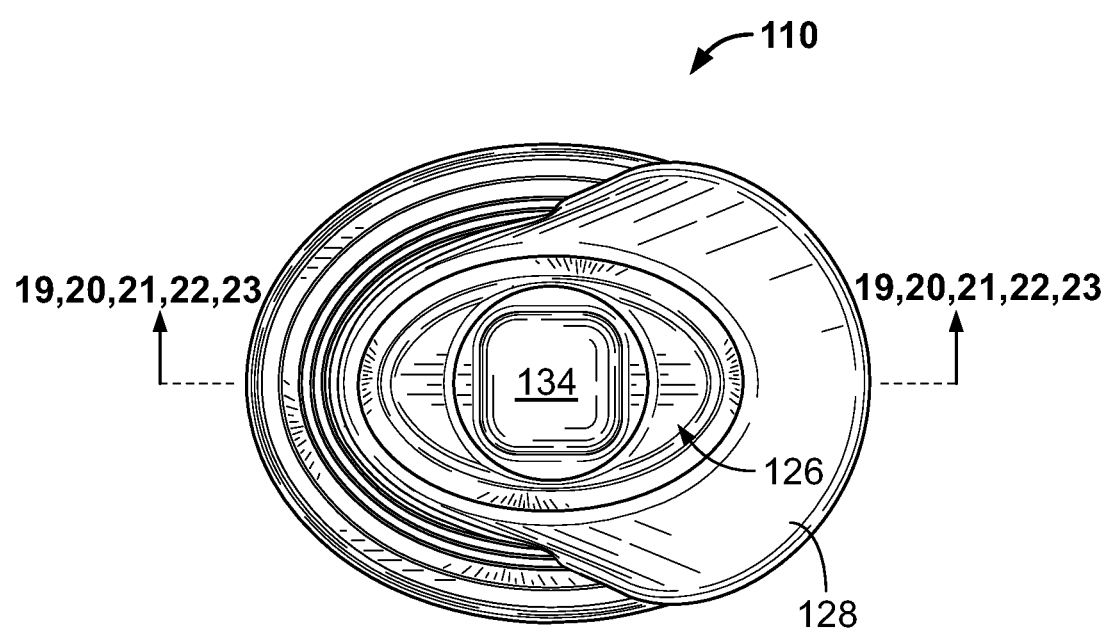
FIG. 15 is top plan view of a collapsible container or bottle in a fully expanded state according to a second embodiment of the invention.
Figure 16:
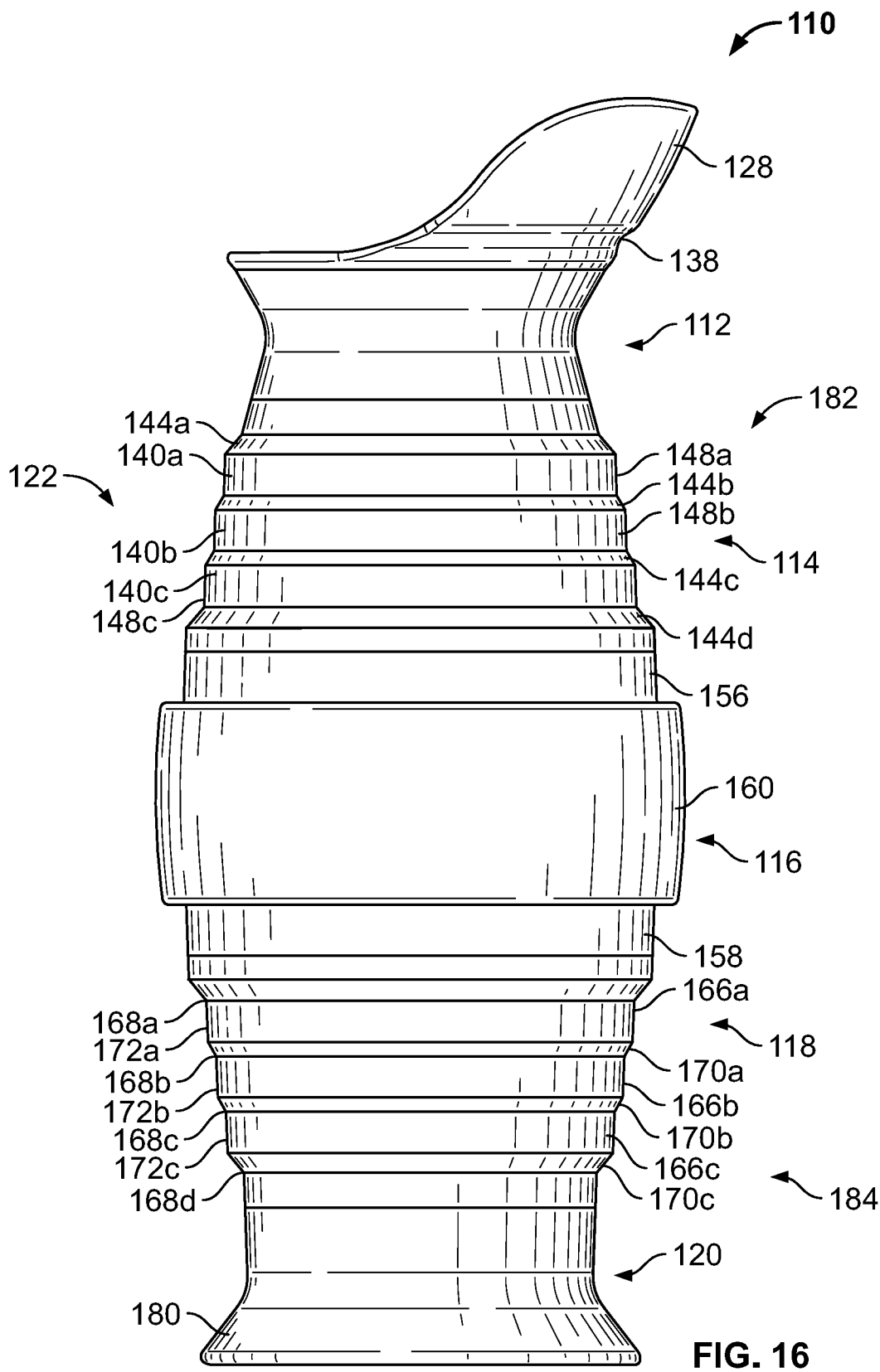
FIG. 16 is a side elevation view of the collapsible container depicted in FIG. 15.
Figure 17:
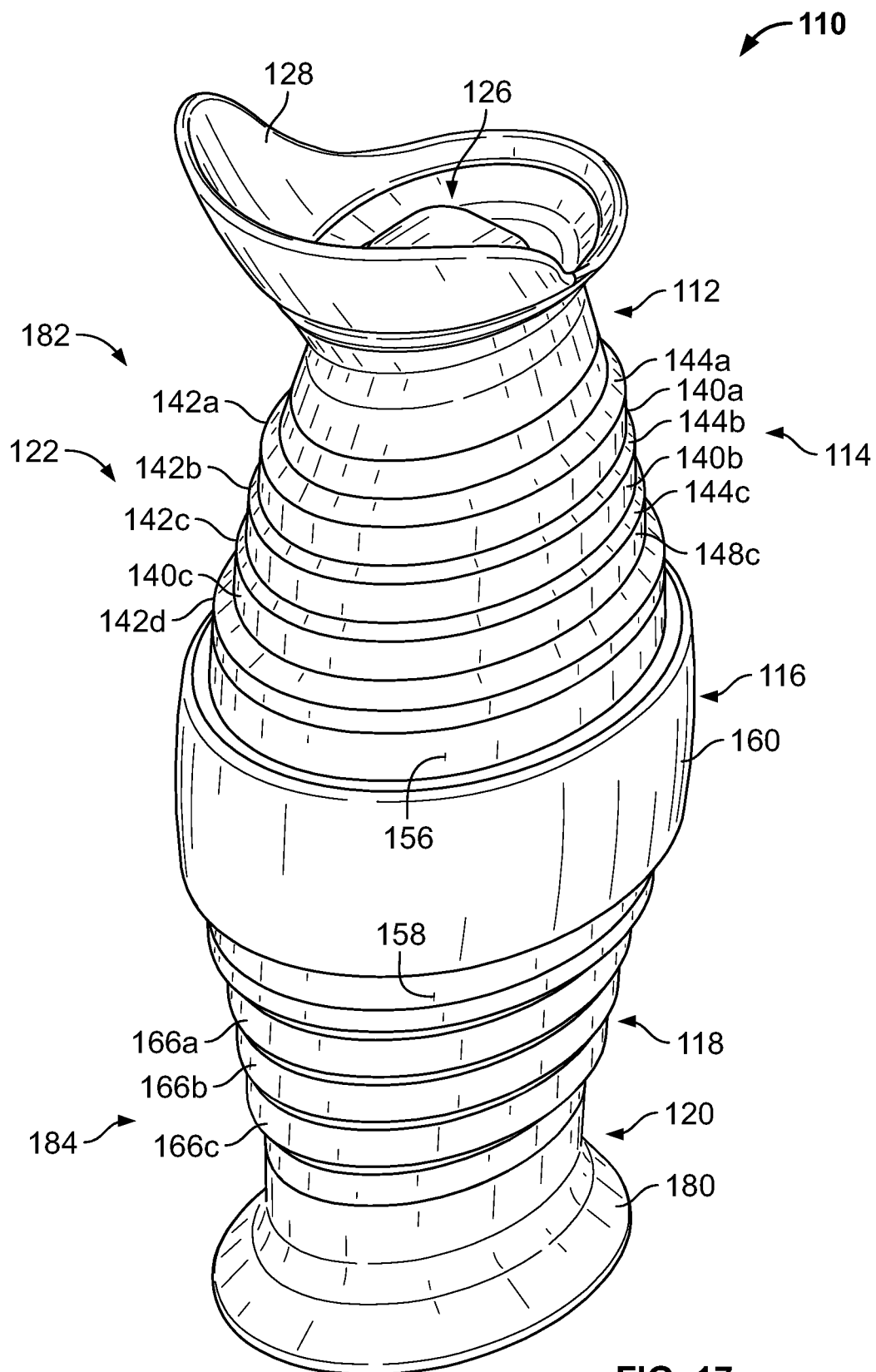
FIG. 17 is a perspective view of the collapsible container depicted in FIG. 15.
Figure 18:
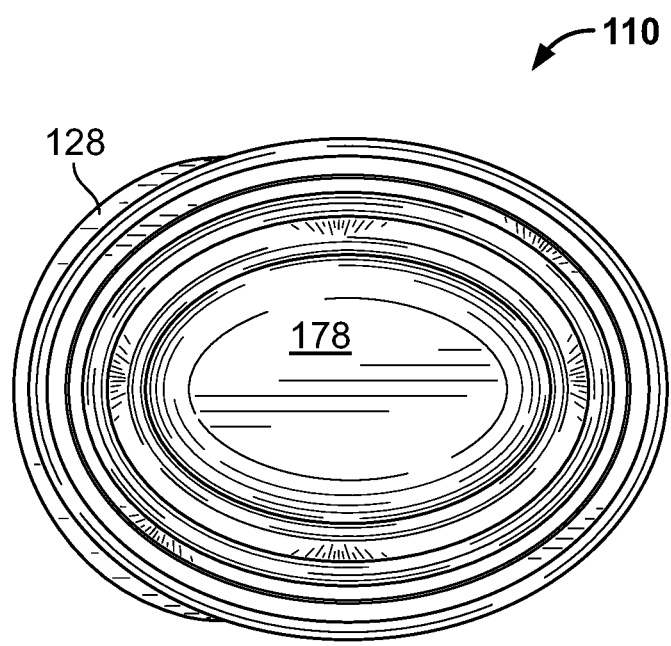
FIG. 18 is a bottom plan view of the collapsible container depicted in FIG. 15.
Figure 19:
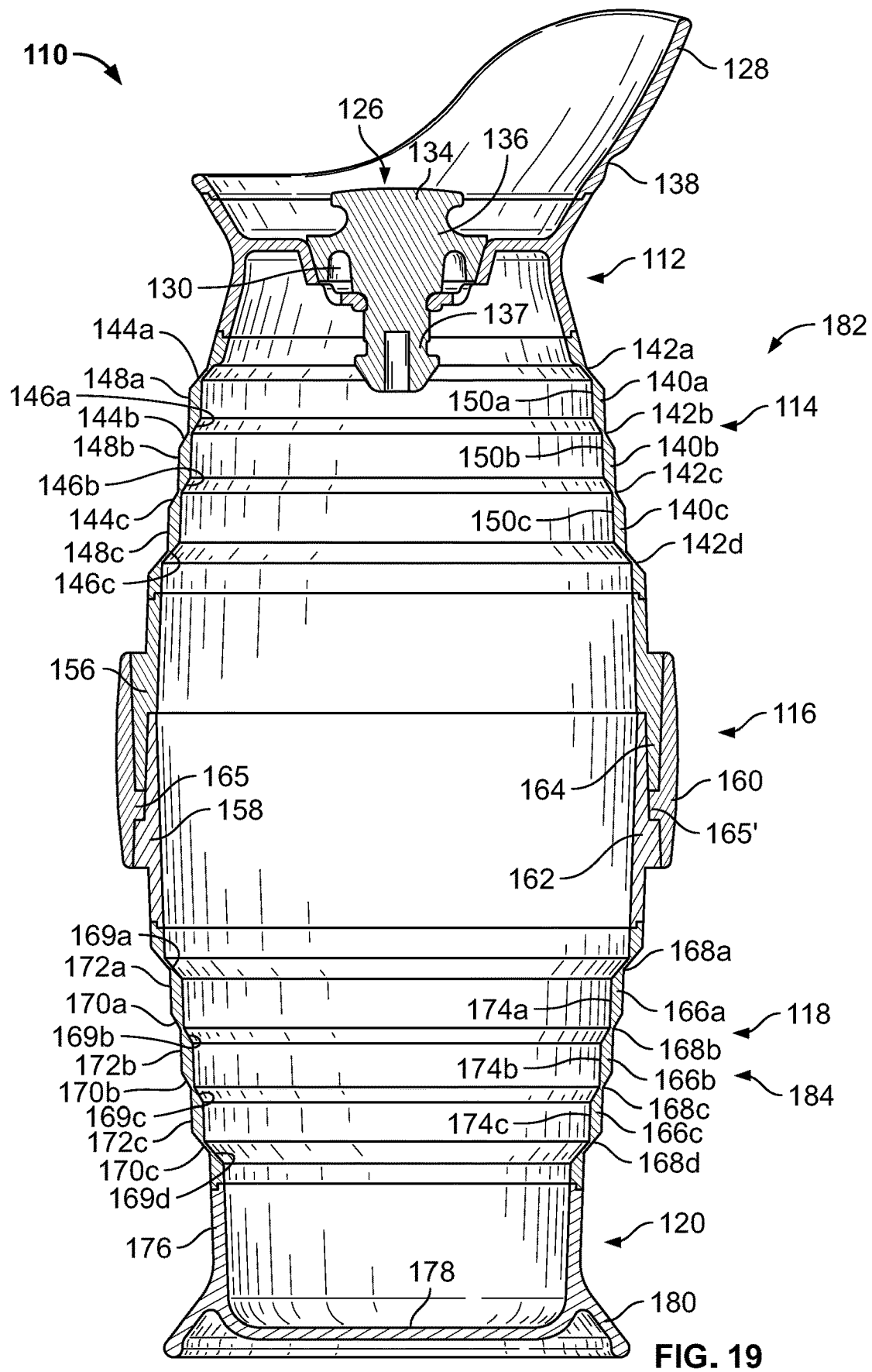
FIG. 19 is a cross-sectional elevation view of the collapsible container of FIG. 15 taken along line 19-19 of FIG. 15.

Lid 24 may be secured to opening 22 by any suitable method including threaded engagement between lid 24 and opening 22, which may be configured to form a watertight seal when fully secured or screwed into opening 22. In that regard, a suitable gasket may also be utilized (not shown). As illustrated in FIGS. 3 and 12, located above rim 30 are one or more catches 32, each of which has a downwardly extending protuberance 35. Lid 24 has two notches 34 which when aligned with catches 32 allow the lid to be placed onto rim 30. Lid 24 also has protrusions 36 that engage catches 32 when lid 24 is rotated counterclockwise so that protrusions 36 pass under protuberances 35 to secure lid 24 over opening 22. Preferably, lid 24 has a handle 38, which is pivotally attached to lid 24 and a recess 40 in which the handle can rest.

Bottom tier 14 has a base portion 42 and a sidewall portion 44. Base portion 42 has no less than three feet 50, an upstanding circumferential male portion 52 and a circumferential and radially extending flange 54. Sidewall portion 44 has a female portion 56 and a circumferential and radially extending flange 58. Male portion 52 extends into and frictionally engages female portion 56 forming a watertight seal. Flange 54 abuts flange 58 and include respective step 59 and step 60. The exterior of the combination of flanges 54 and 58 is covered by a stretched elastomeric layer 61, which holds base portion 42 and sidewall portion 44 together. Elastomeric layer 61 covers at least partially male portion 52 and female portion 56. Preferably, base portion 42 and sidewall portion 44 are secured to each other without any adhesives, the use of which adhesives can leach an off-flavor or toxins potentially to the contents of container 10.

Figure 11:
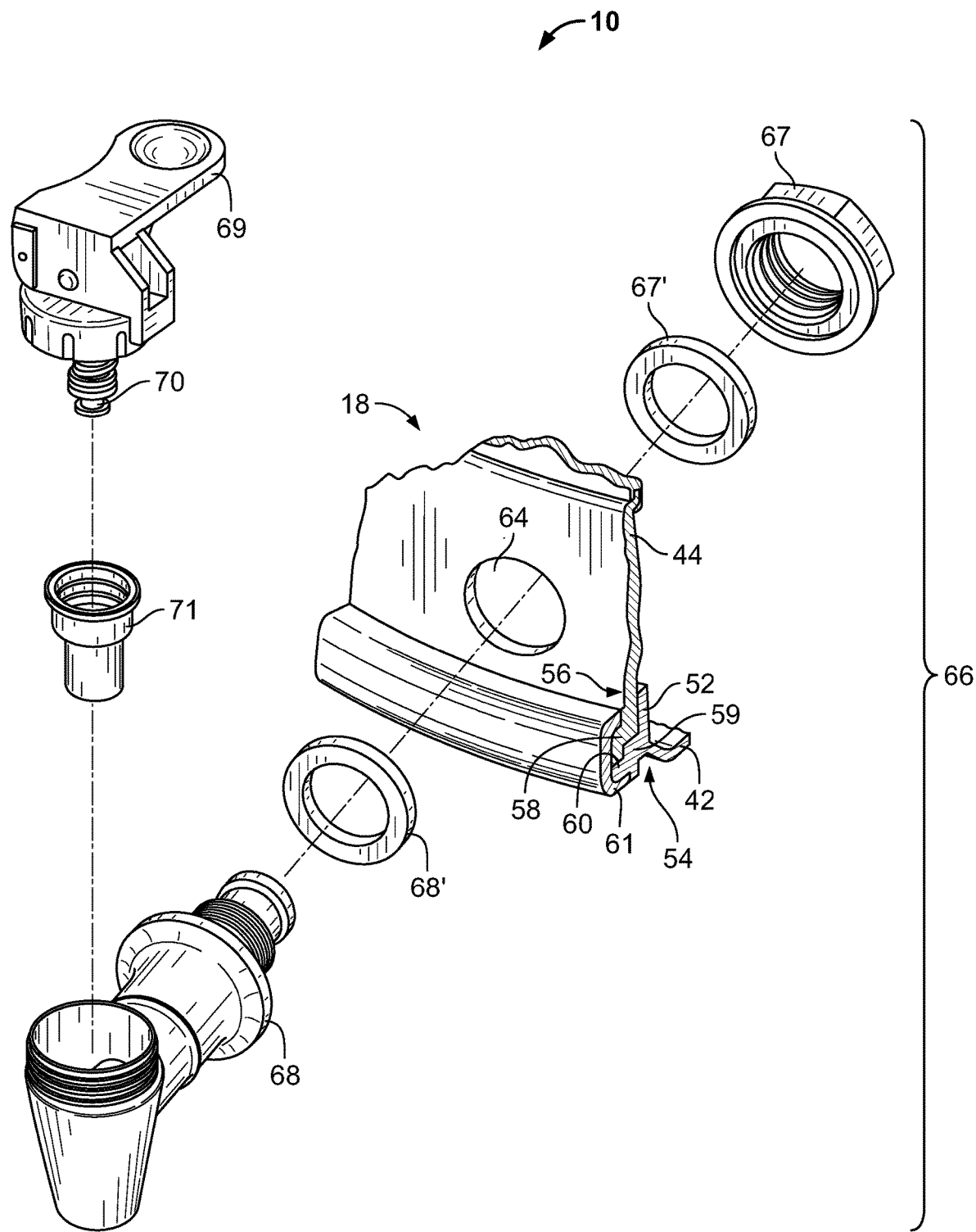
FIG. 11 is an exploded view of the faucet with a fragmentary view of the collapsible container shown in FIG. 1.

Bottom tier 14 also has an opening 64 and a spigot or faucet 66 as shown in FIG. 11. Opening 64 is located in sidewall portion 44 and a faucet 66 of any suitable design extends through opening 64. As illustrated, faucet 66 is secured to sidewall portion 44 by a nut 67 and an o-ring 67' on the inside of sidewall portion 44 and faucet flange 68 and an o-ring 68' on the outside of sidewall portion 44. Faucet 66 has a rotatable and tiltable handle 69 connected to spring-loaded stem 70 that is covered by an elastomeric seal 71. Handle 69 may be rotated for ease of use and compaction during non-use. Indeed handle 69 is shown as extending outwardly in FIGS. 1, 2, 3, 6 and 7 in which bulk liquid container 10 is illustrated in a fully expanded configuration and as extending inwardly in FIGS. 4, 5, 8 and 8A in which bulk liquid container 10 is illustrated in a fully collapsed configuration. Any suitable faucet or spigot may be used in accordance with the invention. If desired, faucet 66 and opening 64 could be eliminated and liquid could be dispersed merely by pouring from opening 27. A suitable pour spout could also be included along opening 64, such as pour spout 128, described hereafter, for example.

Collapsible wall section 16 may be collapsed and expanded to vary the overall height dimension of container shell 18 and thus the available volume within shell 18 for liquids, particularly for water or beverages, and ice. Wall section 16 includes a stiff middle tier 72 between two flexible tiers 74 and 76. Wall section 16 has four living hinges 78. Living hinge 78a is located between top tier 12 and flexible tier 74. Living hinges 78b and 78c are located between tiers 72 and 74 and between tiers 72 and 76, respectively. Living hinge 78d is located between bottom tier 14 and flexible tier 76. Additional tiers and living hinges may be included in the collapsible wall section, preferably adhering to the alternating arrangement in which a flexible tier is connected above and below each stiff tier with living hinges between the tiers.

Container 10 is illustrated in two stable states or configurations, one fully expanded and one fully collapsed. A fully expanded container 10 is illustrated in FIGS. 2, 3, 7, and 9, showing living hinges 78 in their substantially unfolded configurations while a fully collapsed state of container 10 is illustrated in FIGS. 4, 5, 8 and 10, showing living hinges 78 in folded configurations. In its fully expanded state, container 10 provides its maximum volume capacity and in the illustrated embodiment when at maximum capacity and height is about 270 millimeters (mm) high (excluding the handle) and a maximum diameter of about 325 mm, while in its fully collapsed state, container 10 is about 80 millimeters tall (excluding the handle) for the illustrated embodiment, about a 70% reduction from the maximum height at its most compact state, which is particularly convenient for storage and transportation. At least two partially collapsed states of container 10 are also possible (not shown), in which only hinges 78a and 78b are folded or only hinges 78c and 78d are folded.

Shell 18 in combination with faucet 66 and lid 24 is watertight and is adapted to retain water or other liquids in its interior volume, generally defined as the space above the interior bottom surface 80 of bottom tier 14 and below top opening 22.

Referring generally to FIGS. 15-25, bottle 110 is illustrated as a multi-tiered container including a stiff or rigid upper tier 112 (sometimes described herein as top tier 112), an upper collapsible wall section 114, a stiff or rigid middle tier 116, a lower collapsible wall section 118, and a stiff or rigid lower tier 120 (sometimes described herein as bottom tier 120). Tiers 112, 116 and 120 and collapsible wall sections 114 and 118 combine to form a container shell 122.

Figure 20:
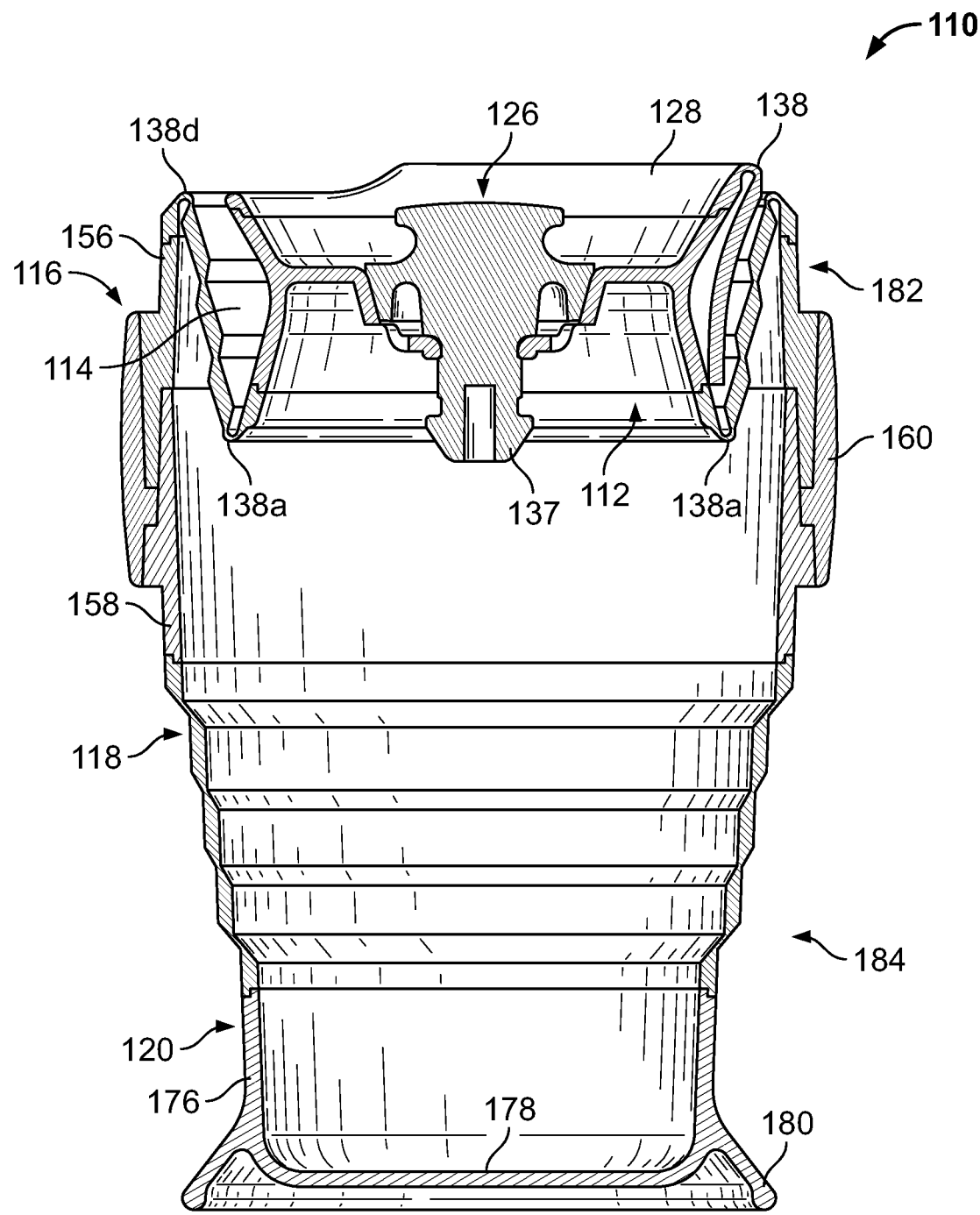
FIG. 20 is a cross-sectional elevation view taken on line 20-20 of FIG. 15 in which the top half of the collapsible container of FIG. 15 is in a collapsed state.
Figure 22:
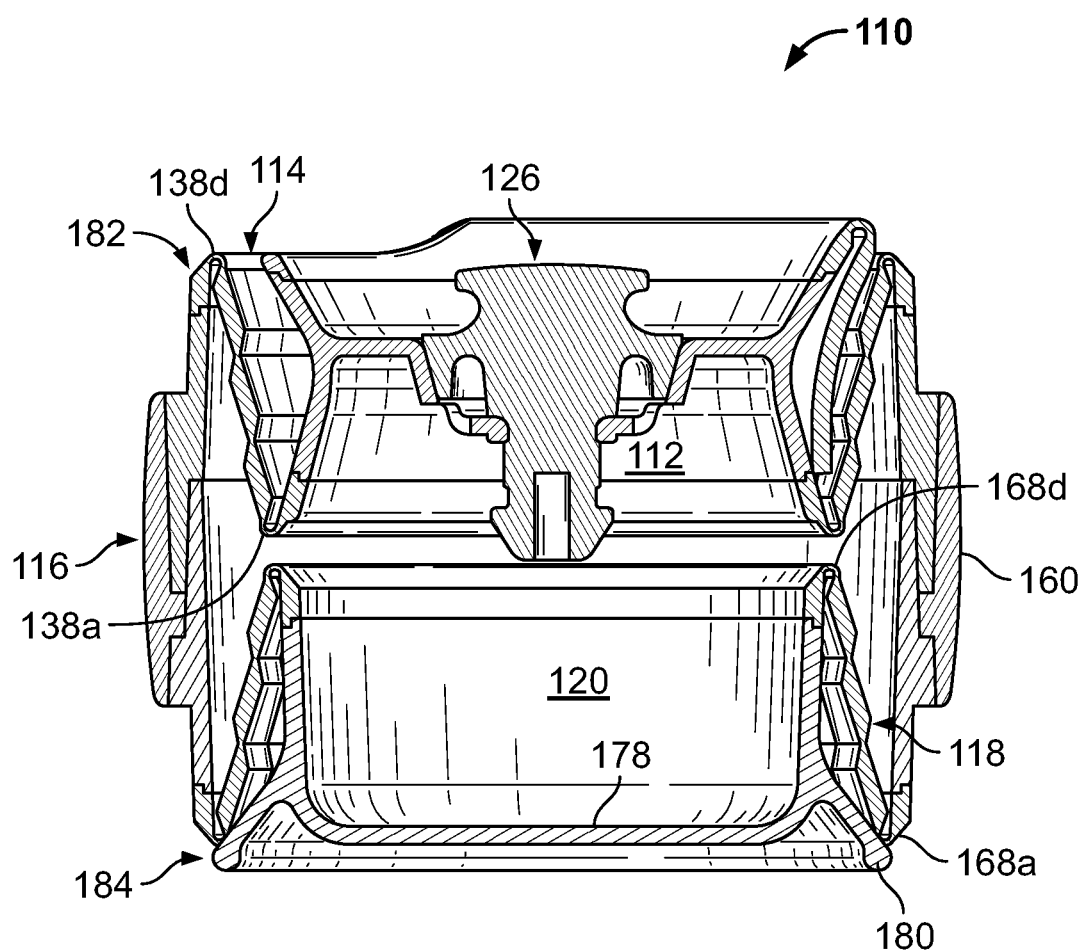
FIG. 22 is a cross-sectional view taken on line 22-22 of FIG. 15 in which the collapsible container depicted in FIG. 15 is in a fully collapsed state.
Figure 23:
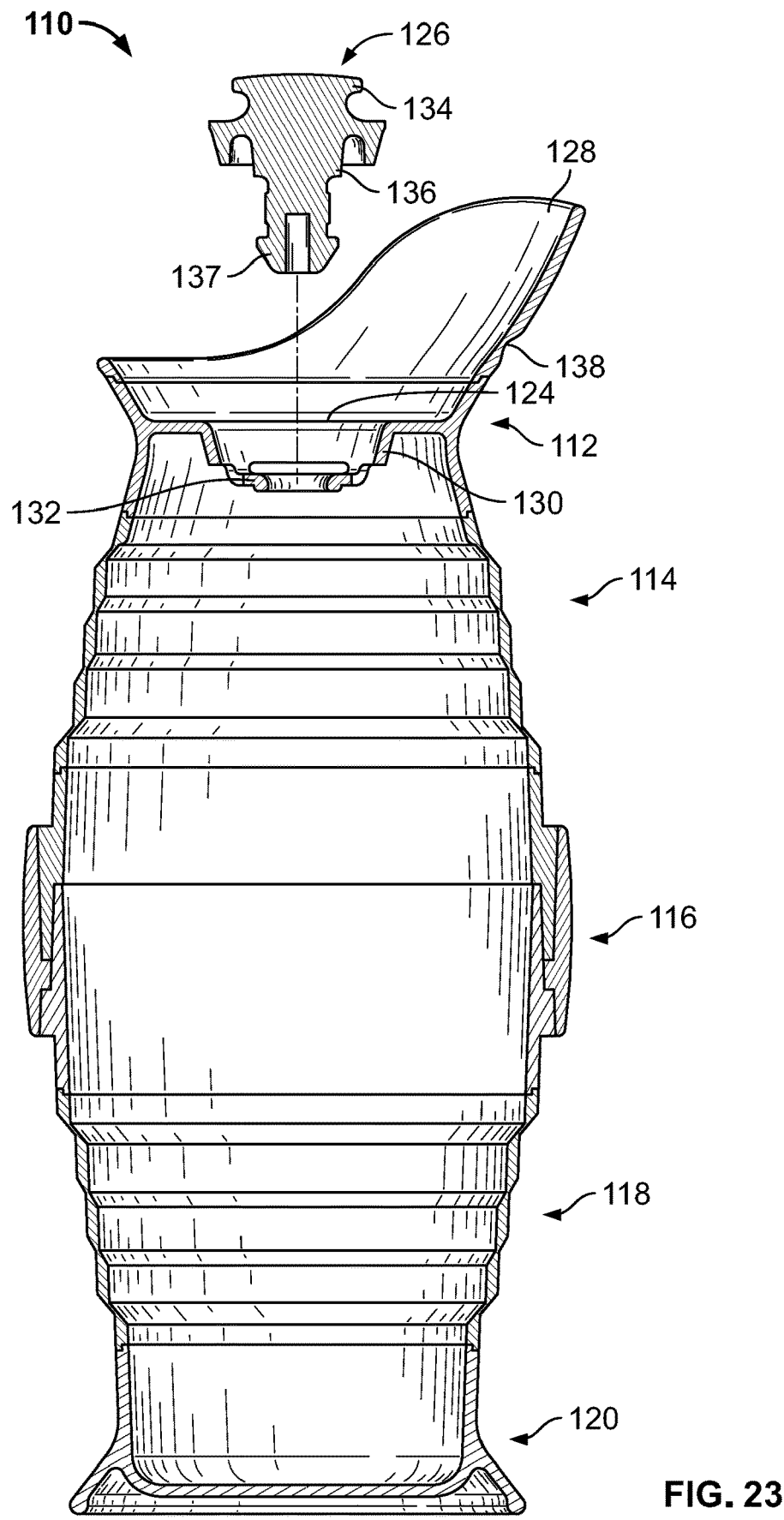
FIG. 23 is a partially exploded cutaway view taken on line 23-23 of FIG. 15 of the collapsible container depicted in FIG. 15.
Figure 24:
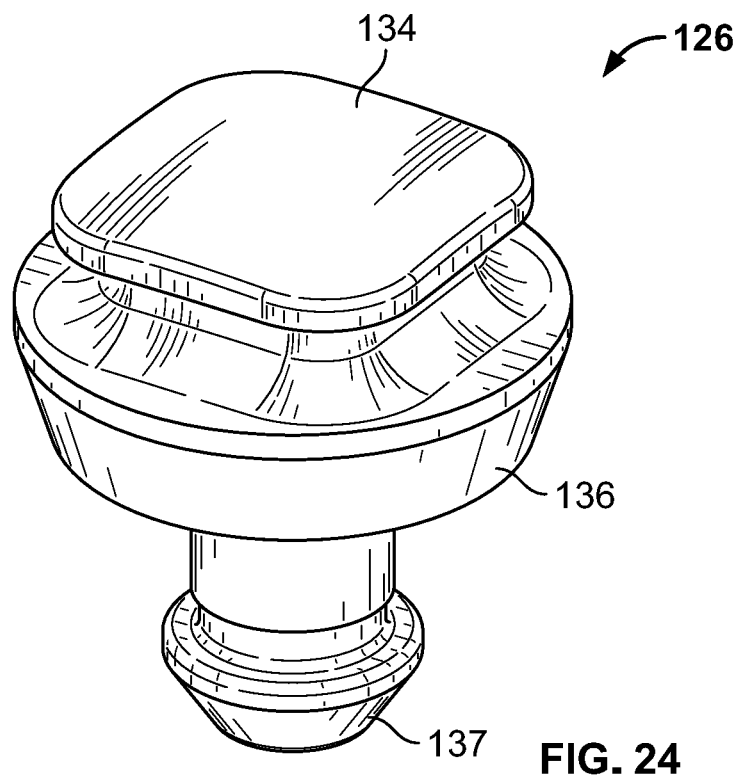
FIG. 24 is a perspective view of the cap of the collapsible container depicted in FIG. 15.
Figure 25:
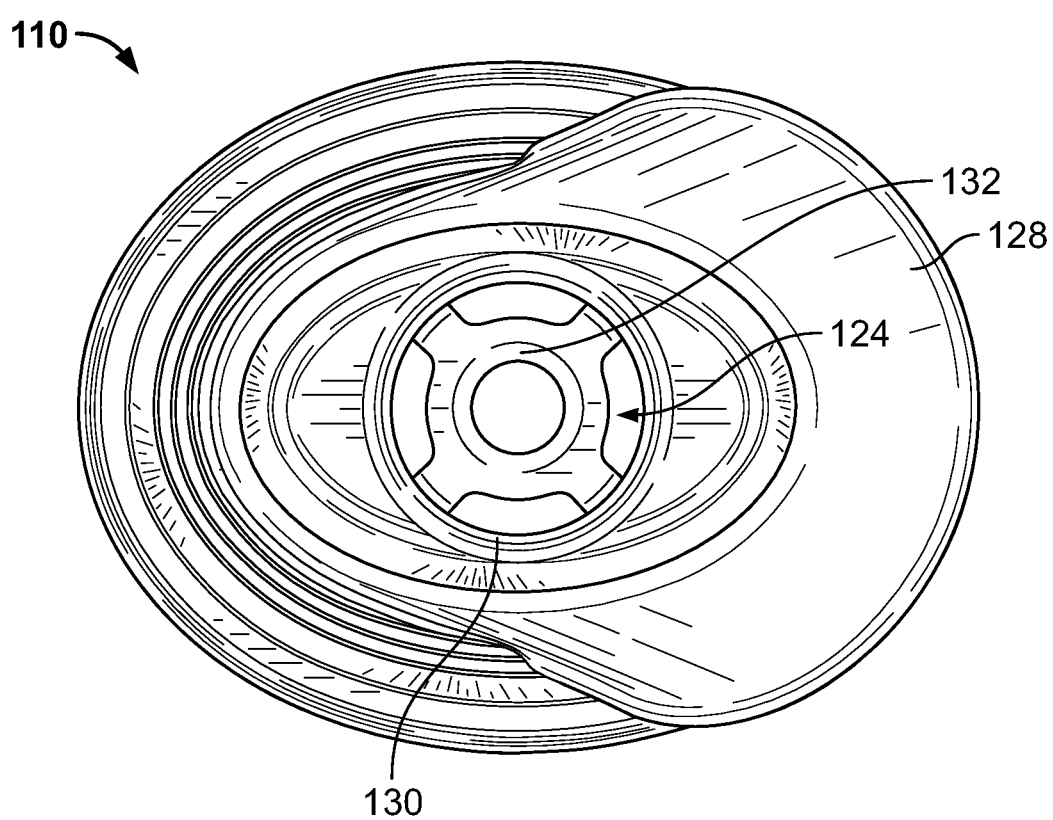
FIG. 25 is top plan view of the collapsible container depicted in FIG. 15 without the cap.
Figure 26:
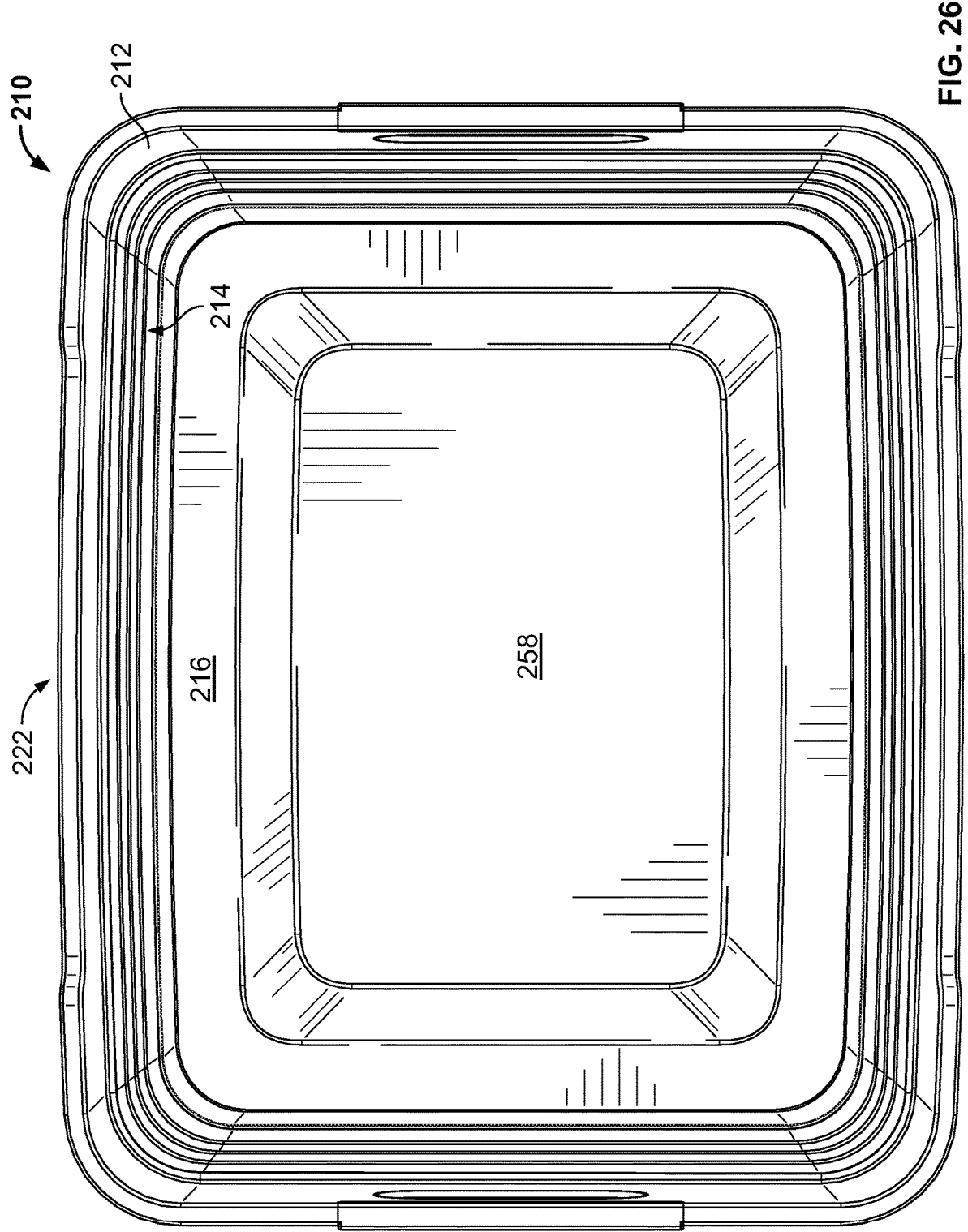
FIG. 26 is top plan view of a collapsible container or tub in a fully expanded state according to a third embodiment of the invention.
Figure 27:
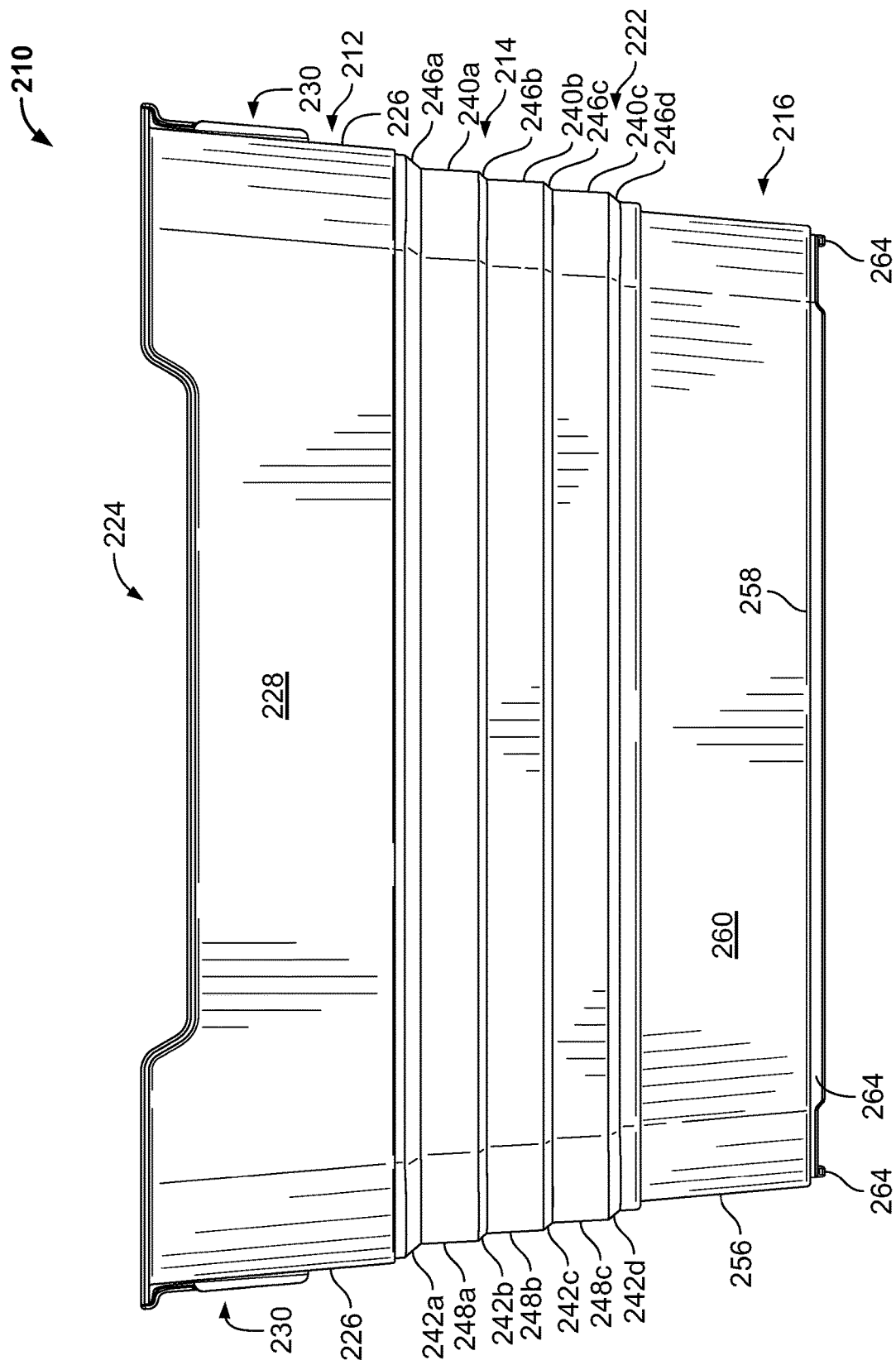
FIG. 27 is a side elevation view of the collapsible container depicted in FIG. 26.
Figure 28:
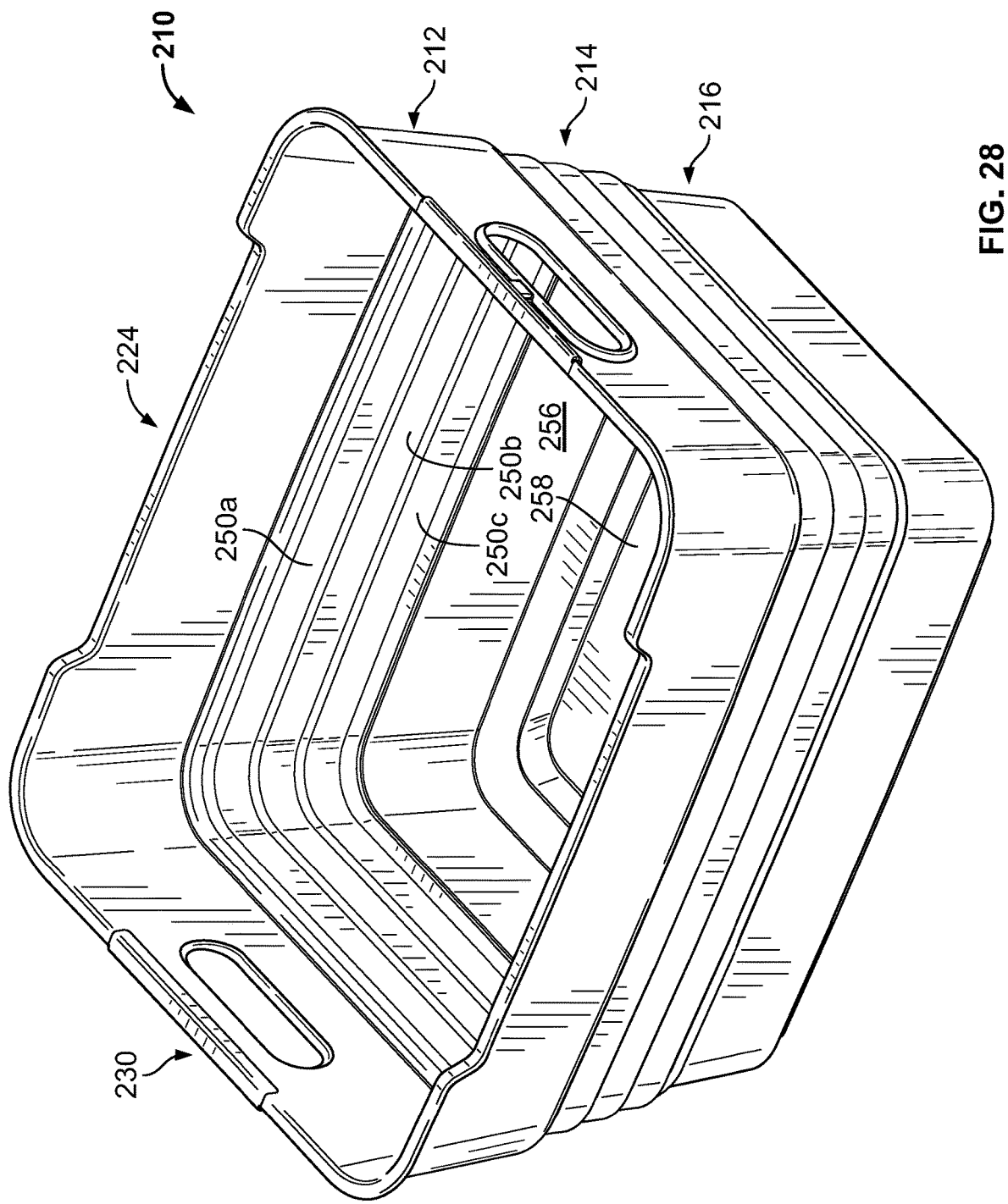
FIG. 28 is a perspective view of the collapsible container depicted in FIG. 26.
Figure 29:
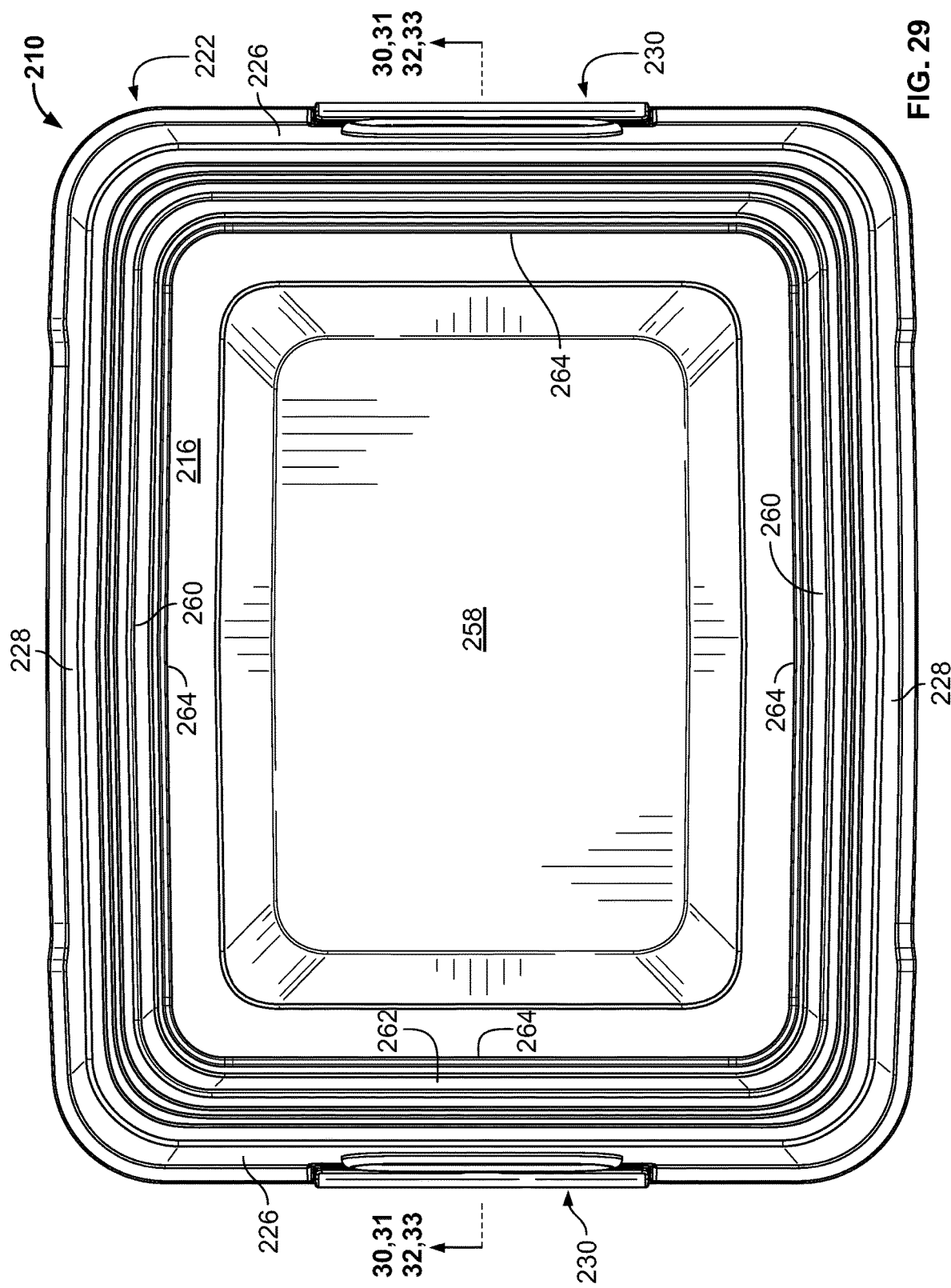
FIG. 29 is a bottom plan view of the collapsible container depicted in FIG. 26.
Figure 30:
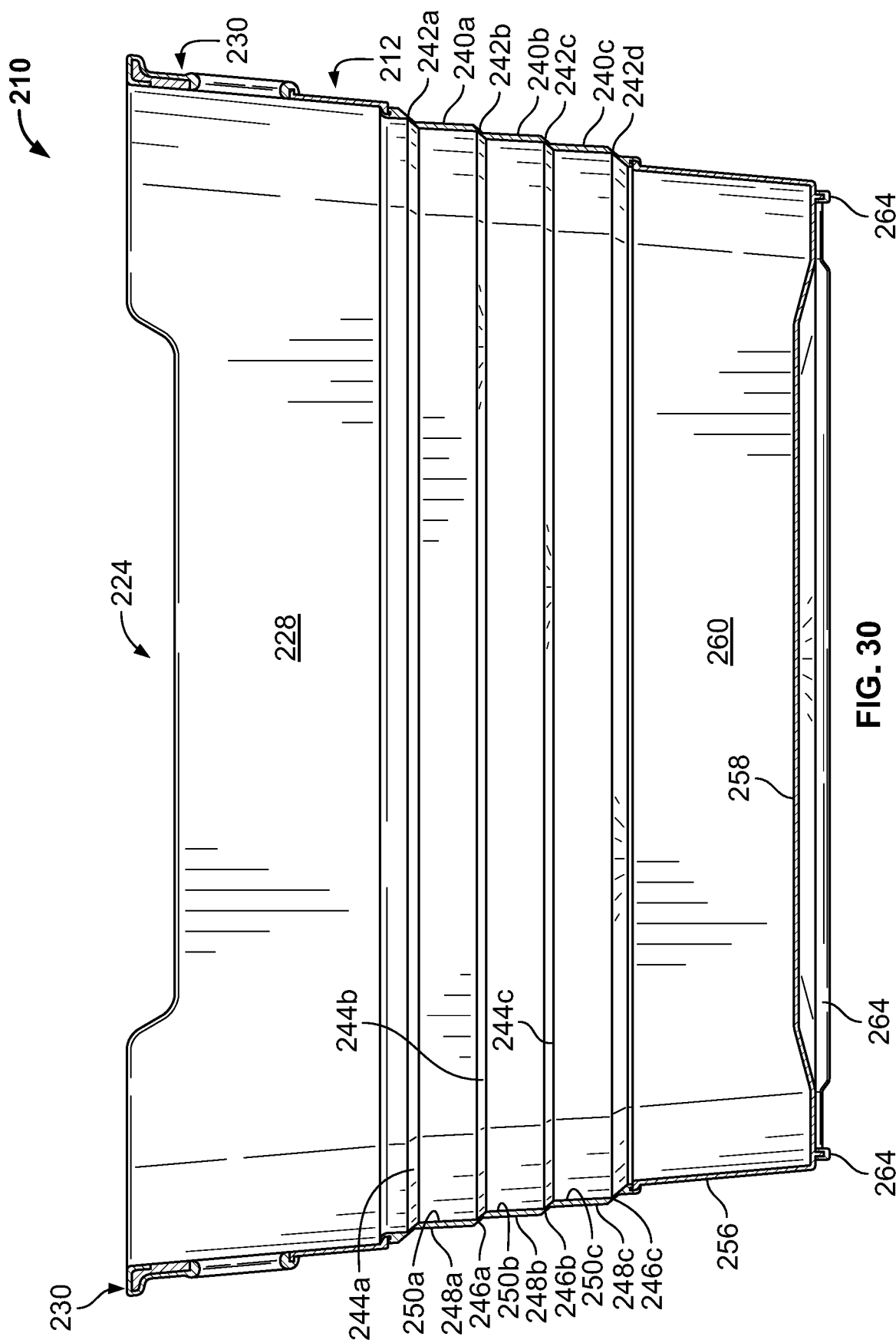
FIG. 30 is a cross-sectional side view along line 30-30 of FIG. 29 of the collapsible container depicted in FIG. 26.
Figure 34:
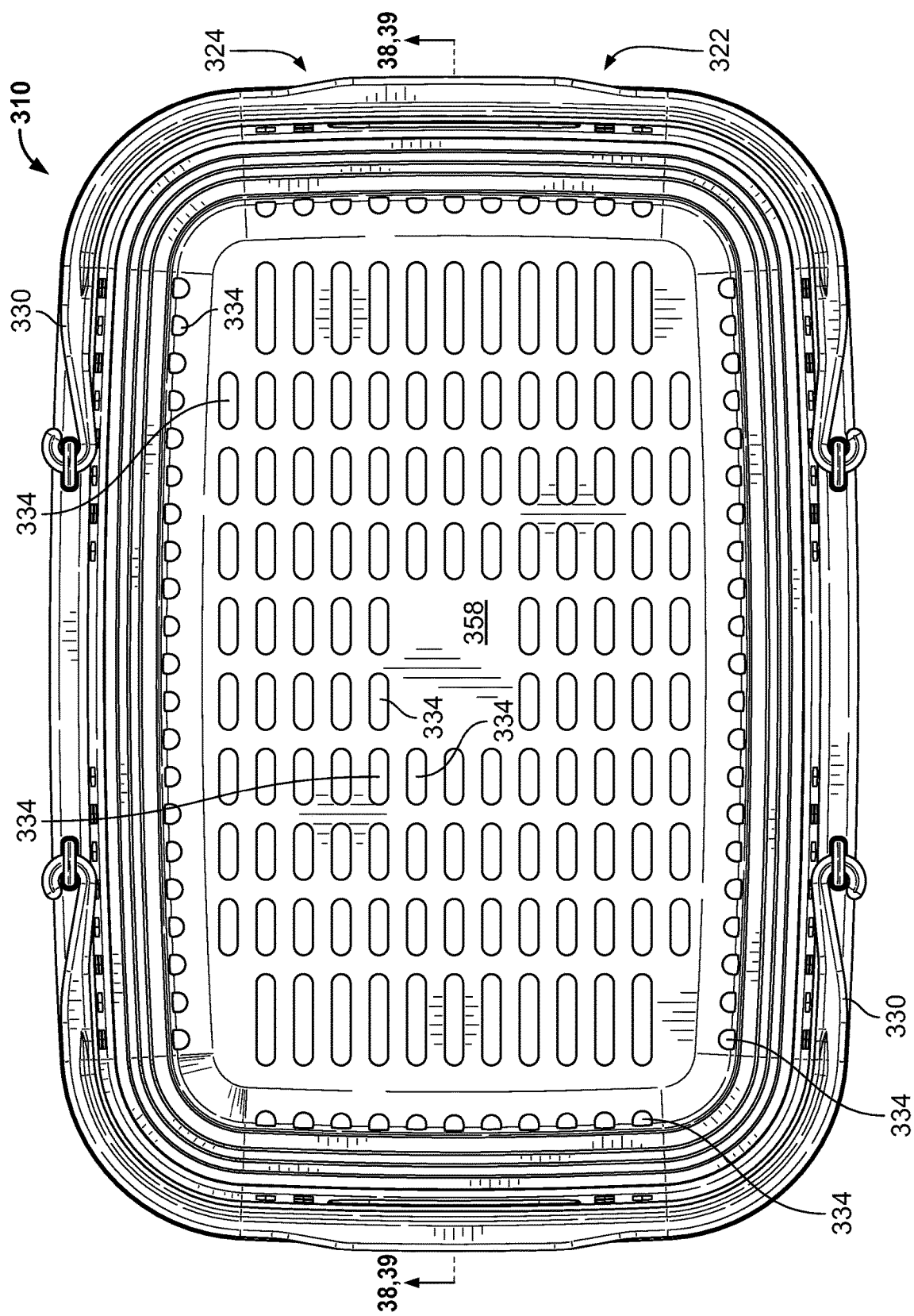
FIG. 34 is top plan view of a collapsible container or basket in a fully expanded state according to a fourth embodiment of the invention.
Figure 35:
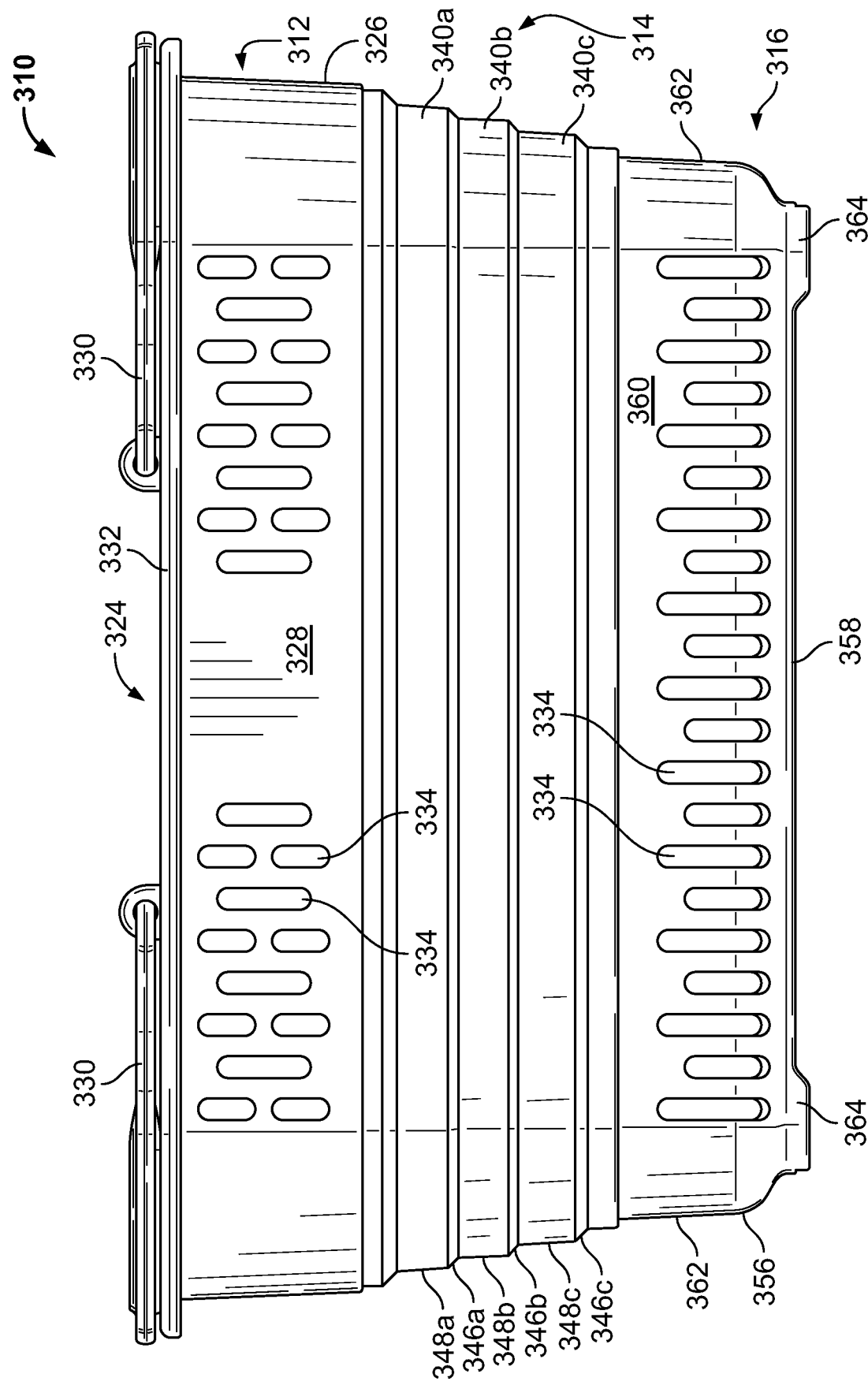
FIG. 35 is a side elevation view of the collapsible container depicted in FIG. 34.
Figure 36:
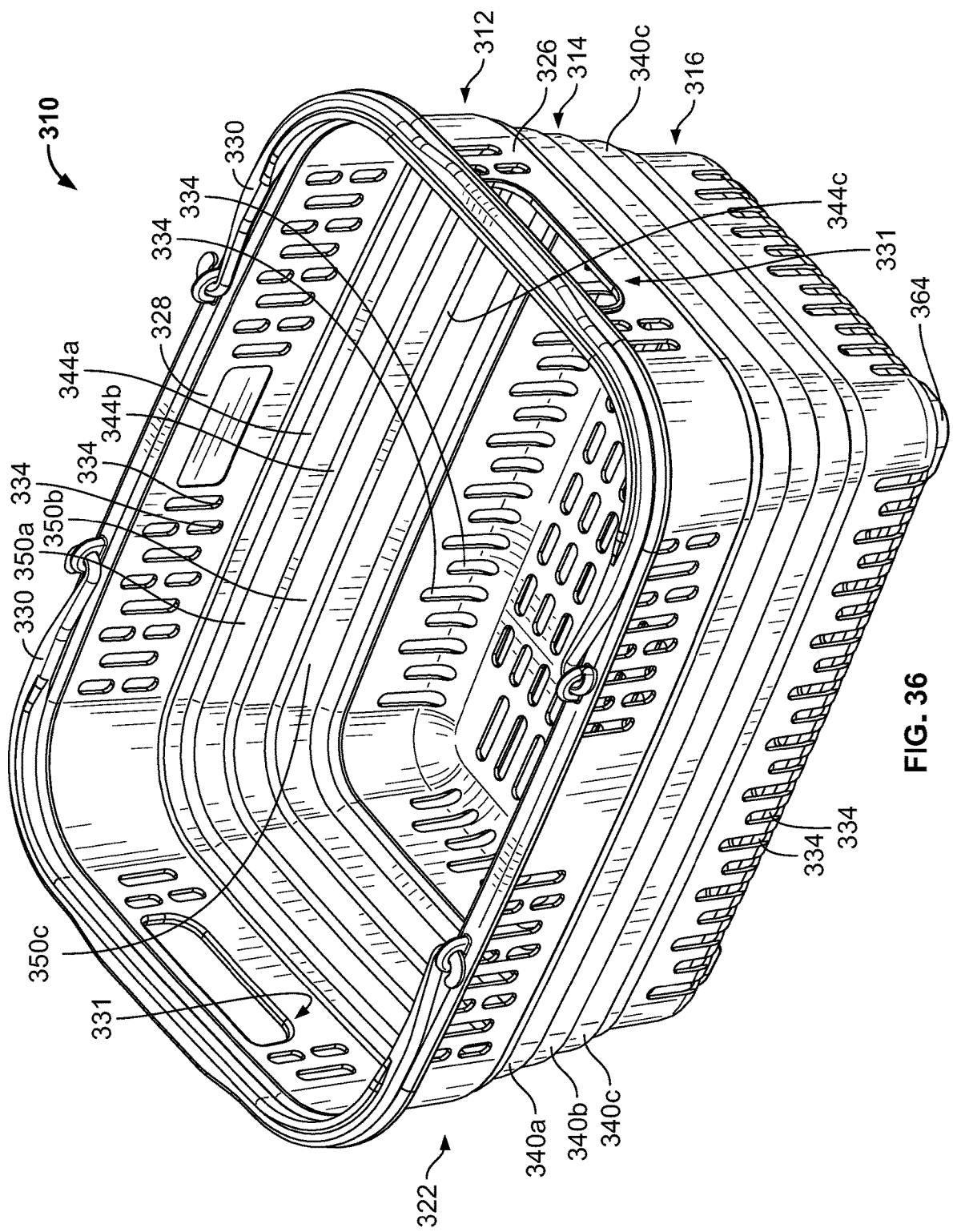
FIG. 36 is a perspective view of the collapsible container depicted in FIG. 34.
Figure 37:
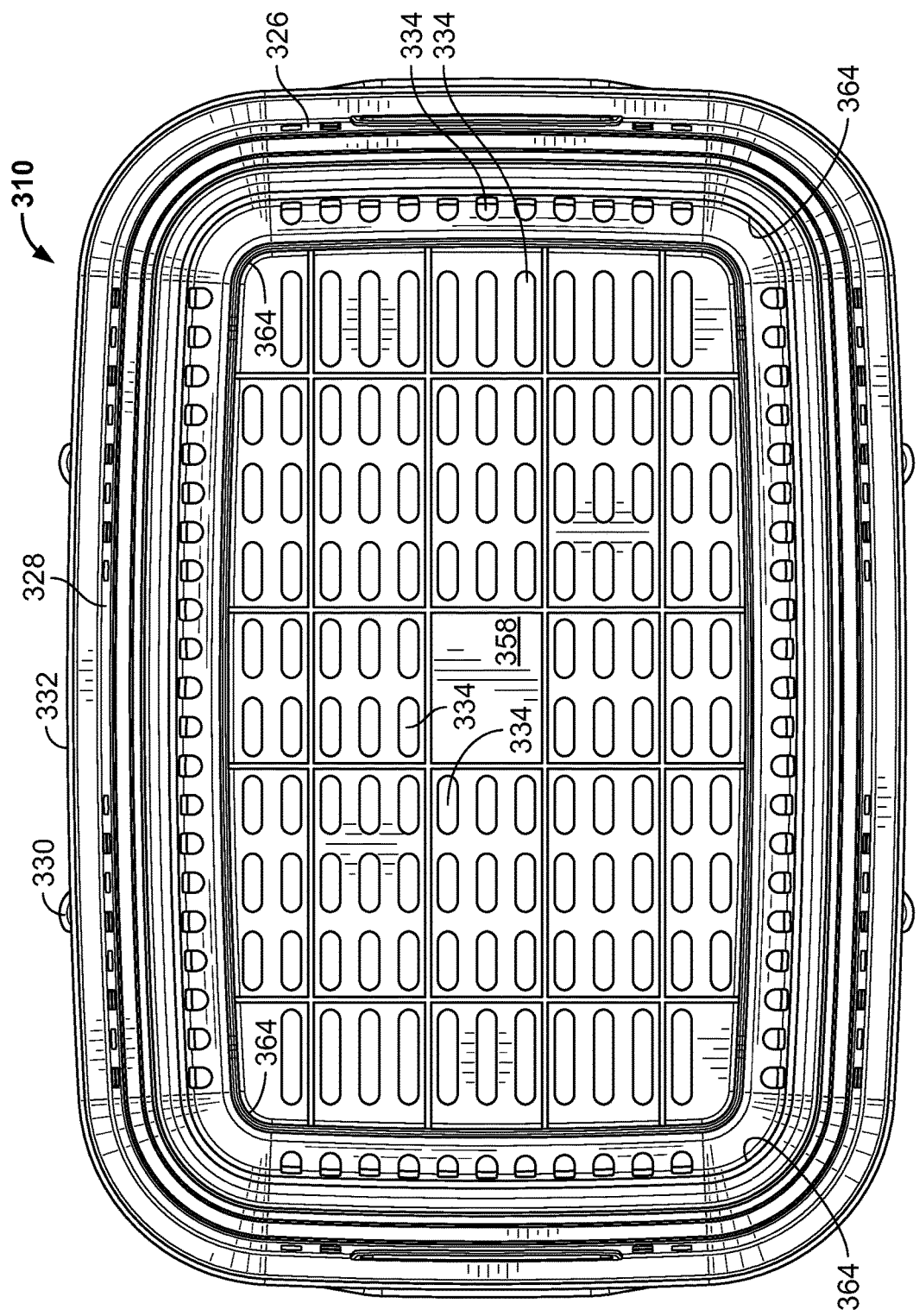
FIG. 37 is a bottom plan view of the collapsible container depicted in FIG. 34.
Figure 38:
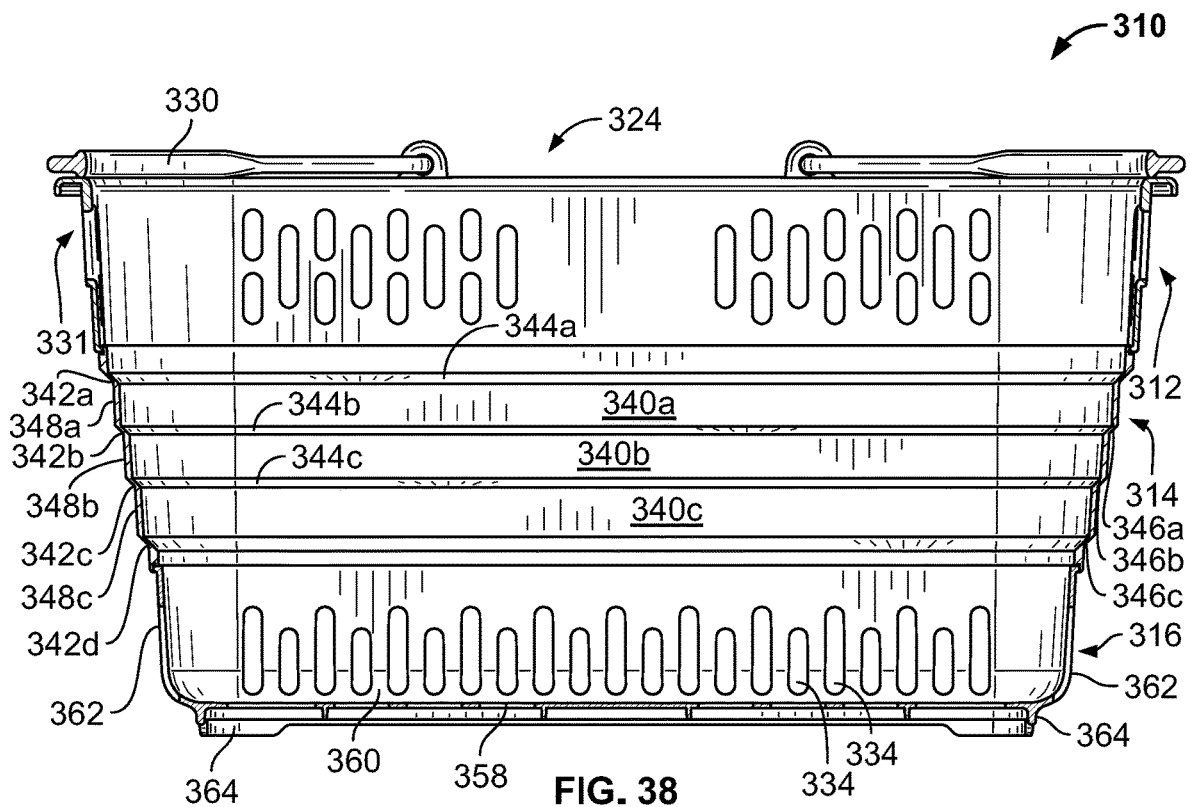
FIG. 38 is a cross-sectional elevation view along line 38-38 of FIG. 34 of the collapsible container depicted in FIG. 34.

Top tier 112 has a top opening 124, a lid 126 and a spout 128. Opening 124 has a throat 130 having a plug support or basket 132, which is best seen in FIG. 25. Lid 126 may be of any suitable structure. As illustrated particularly in FIGS. 23 and 24, lid 126 has a handle 134, a plug body 136 having a pronged end 137. Opening 124 may be partially opened by lifting lid 126 allowing a liquid contained in bottle 110 to flow out around lid 126. Pronged end 137 in conjunction with basket 132 prevent the accidental complete removal of lid 126, but do not prevent the complete removal of lid 126. Spout 128 has a living hinge 138 around which spout 128 can be folded as shown in FIGS. 20 and 22.

Upper collapsible wall section 114 has three principal generally annular tiers 140 and four living hinges 142. Living hinges 142a and 142d are located proximal to stiff or rigid tiers 112 and 116. Living hinges are 142b and 142c are located between and connect tiers 140a and 140b and are located between and connect tiers 140b and 140c, respectively. Tiers 140 are substantially vertical when bottle 110 is substantially upright. Tiers 140 have a sloping top surface 144, a sloping bottom surface 146, exterior surfaces 148, and interior surfaces 150. Surfaces 144 and 146 are preferably substantially parallel. Surfaces 148 and 150 are preferably substantially parallel and substantially vertical. The thickness 152 of tier 140 between one exterior surface 148 and the adjacent interior surface 150 is significantly greater than the thickness 154 of collapsible wall section 114 between one top surface 144 and the adjacent bottom surface 146 such that a living hinge 142 exists at the top and bottom of each tier 140 as illustrated in FIG. 21A. Thus, each living hinge (e.g., 142) can be composed of an annular ring of material that is thinner than the upper and lower regions adjacent the living hinge (e.g., 142). Alternatively, the living hinge (e.g., 142) could be constructed of material more flexible than the material in regions above and below the living hinge (e.g., 142). Tiers 140 are arranged stepwise with small horizontal steps between tiers 140 and with respect to tiers 112 and 116. By having vertical tiers 140 vertically oriented, it is possible to maximize the capacity of wall section 114 and container 110 for a given container diameter.

Middle tier 116 has a generally annular first or top portion 156, a generally annular second or bottom portion 158 and a stretched elastomeric sleeve or layer 160. Top portion 156 is connected to collapsible wall section 114 and has a generally annular male portion 162. Bottom portion 158 is connected to collapsible wall section 118 and has a generally annular female portion 164. Alternatively, portion 156 was the female portion 164 and portion 158 has the male portion 162. Male portion 162 extends into and frictionally engages female portion 164 forming a watertight seal. The exterior of the combined or overlapped male and female portions 162 and 164 is at least partially covered by elastomeric layer 160. Preferably, portions 156 and 158 are secured together without adhesive, which can leach an off-flavor or toxins to the contents of container 110. Middle tier 116 also has an circumferential slot 165 for accepting a generally annular matching projection 165' of elastomeric layer 160 to better keep elastomeric layer 160 in place. Layer 160 is also beneficial as it makes bottle 110 easier to grip around middle tier 116.

Lower collapsible wall section 118 has three principal generally annular tiers 166 and four living hinges 168. Tiers 166 are substantially vertical when bottle 110 is substantially upright. Tiers 166 have a sloping top surface 169, a sloping bottom surface 170, exterior surfaces 172, and interior surfaces 174. Surfaces 169 and 170 are preferably substantially parallel. Surfaces 172 and 174 are preferably substantially parallel and substantially vertical. Collapsible wall section 118 is substantially similar to wall section 114; the principal difference is that wall section 118 is inverted when compared to wall section 114.

Bottom tier 120 has a generally annular sidewall 176, a bottom 178, and a skirt 180 for stability.

Figure 21:
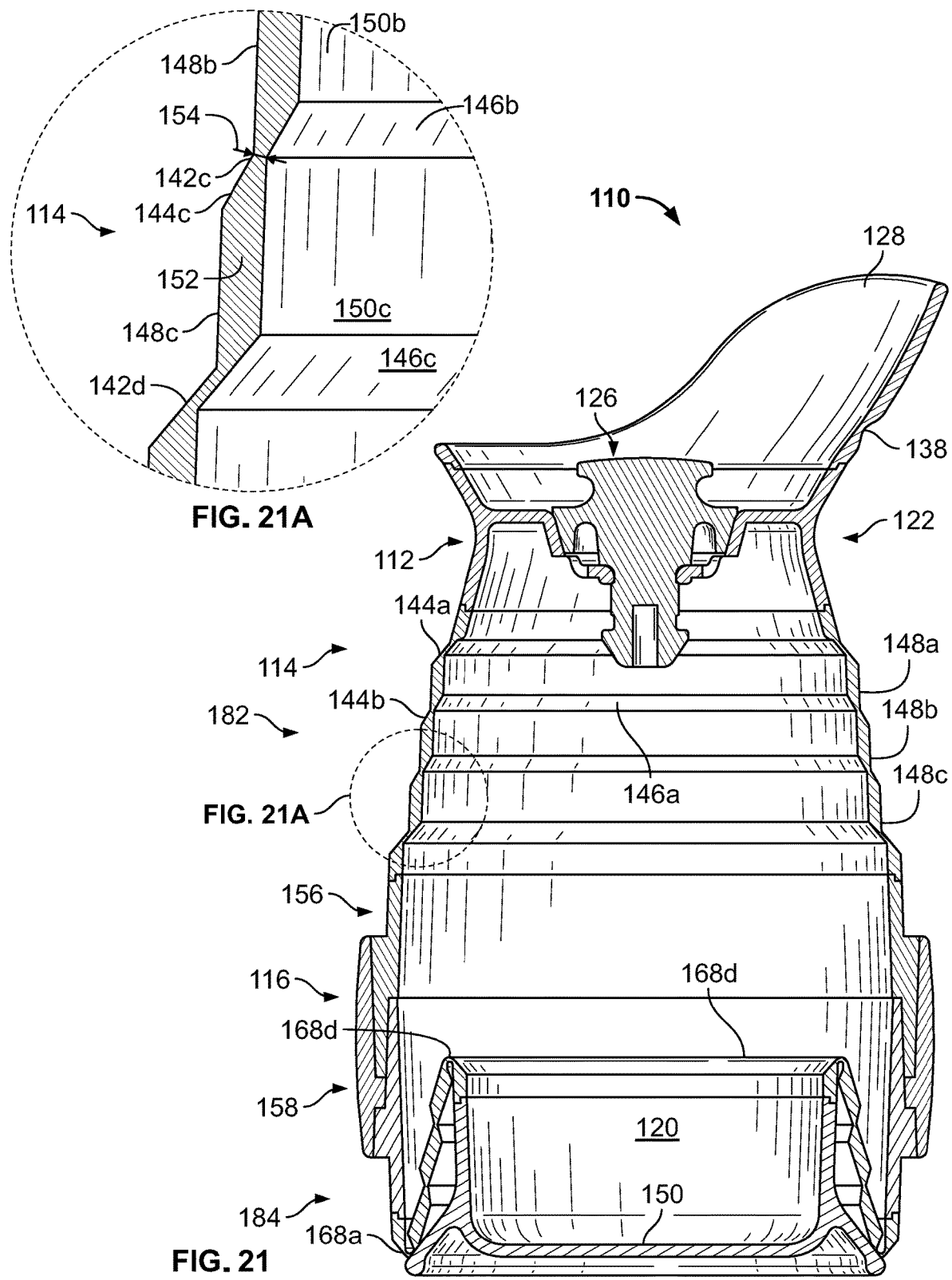
FIG. 21 is a cross-sectional elevation view taken on line 21-21 of FIG. 15 in which the bottom half of the collapsible container of FIG. 15 is in a collapsed state.

Bottle 110 is illustrated in four stable states or configurations. A fully expanded container 110 is illustrated in FIGS. 16, 17, 19 and 23 showing living hinges 142 and 168 in their substantially unfolded configurations. FIG. 22 shows bottle 110 fully collapsed with living hinges 142a, 142d, 168a and 168d in folded configurations. Spout 128 is also folded and is partially inserted into middle tier 116. In its fully expanded state, bottle 110, about 225 mm high (with spout up) and about 75 mm wide and 95 mm long in the illustrated embodiment, provides its maximum volume capacity, while in its fully collapsed state, about 75 mm high (including the spout folded down) or about a 67% reduction in height from the maximum height, bottle 110 is at its most compact, which is particularly convenient for storage and transportation. Two partially collapsed states of bottle 110 are also shown in FIGS. 20 and 21. In FIG. 20, the top half 182 of bottle 110, which includes top tier 112, collapsible wall section 118, and top portion 156, is in a fully collapsed state in which hinges 142a and 142d and spout 128 are folded, but the bottom half 184 of bottle 110 is fully expanded. In. FIG. 21, top half 182 is fully expanded while bottom half 184 is in a fully collapsed state in which living hinges 168a and 168d are folded, Other partially collapsed states are possible in which either top half 182 or bottom half 184 are partially collapsed and the other half is fully expanded, partially collapsed, or fully expanded. If top half 182 is partially collapsed, one of hinges 142b and 142c are folded. If bottom half 184 is partially collapsed, one of hinges 168b or 168c are folded. Partial collapse states are further discussed with respect to tub 210. Bottle 110 may be closed with lid 126 and partially collapsed to minimize headspace over a liquid to reduce carbonation loss if the liquid is carbonated, to minimize oxidation if the liquid is oxidation sensitive, or to minimize evaporation heat losses if the liquid is hot.

Each tier of shell 122 is imperforate, and the attachment regions joining neighboring tiers are water impermeable, so that shell 122 is adapted to retain water or other liquids in its interior volume, generally defined as the space above the interior surface of bottom 178 and below opening 124.

With reference to FIGS. 26-33, collapsible tub 210 is illustrated as a multi-tiered container including a stiff or rigid upper tier 212 (sometimes described herein as top tier 212), a collapsible wall section 214, and a stiff or rigid lower tier 216. Tiers 212 and 216 and collapsible wall section 214 combine to form a container shell 222.

Top tier 212 has a top opening 224, end walls 226, sidewalls 228 and handles 230. Handles 230 may be covered with a plastic or elastomeric material that is softer than the material of end walls 226 and sidewalls 228. Top tier 212 has a generally annular shape.

Collapsible wall section 214 has three principal generally annular tiers 240 and four living hinges 242. Living hinges 242a and 242d are located proximal to stiff or rigid tiers 212 and 216. Living hinges are 242b and 242c are located between tiers 240a and 240b and between tiers 240b and 240c, respectively. Tiers 240 are substantially vertical when tub 210 is substantially upright. Tiers 240 have a sloping top surface 244, a sloping bottom surface 246, exterior surfaces 248, and interior surfaces 250. Collapsible wall section 214 is substantially similar to wall section 114 except that wall section 214 is inverted relative to wall section 114.

Lower tier 216 has a generally annular portion 256 and a bottom portion 258. Annular portion 256 has two opposed sidewalls 260 and two opposed end walls 262. Bottom portion 258 has feet 264, which may include a soft plastic or elastomeric covering. Apart from the covering, lower tier 216 may be unitary having been made in a single molding operation.

Tub 210 is illustrated in four stable states or configurations. Tub 210 has many uses, for example as a laundry basket, a wash tub, a container for holding various types of objects. A fully expanded tub 210 (tub height of about 300 mm, length of about 525 mm and width of about 420 mm) is illustrated in FIGS. 26-30 showing living hinges 242 in their substantially unfolded configurations. Two partially collapsed states and a fully collapsed state are illustrated in FIGS. 31-33. FIG. 31 shows a partially collapsed state in which living hinges 242c and 242d are folded. FIG. 32 shows a partially collapsed state in which living hinges 242b and 242d are folded. FIG. 33 shows a fully collapsed state (tub height about 120 mm, about a 50% height reduction) in which living hinges 242a and 242d are folded. A possible collapsed state, which is not illustrated, is one in which hinges 242b and 242c are folded. This possible collapsed state is one that is unlikely to occur without specifically manipulating the container to so collapse because downward pressure on tub 210 typically causes hinge 242d to fold first when hinges 242 have the same thickness because hinge 242d provides the least resistance to folding as it has the shortest circumferential length. Tub 210, optionally with a lid not shown, may be used for storage or transport and partially collapsed to better match the size of tub 210 to its contents, which is particularly beneficial when trying the efficiently use space in a vehicle or a storage space, for example.

Tub 210 can be watertight except for top opening 224 and handles 230. Alternatively, any or all of sidewalls 228 and 260, end walls 226 and 262, and bottom portion 258 may have various apertures.

With reference to FIGS. 34-39, collapsible basket 310, which may be used as a laundry basket or for containing articles as desired, is illustrated as a multi-tiered container including a stiff or rigid upper tier 312 (sometimes described herein as top tier 312), a collapsible wall section 314, and a stiff or rigid lower tier 316. Tiers 312 and 316 and collapsible wall section 314 combine to form a container shell 322.

Top tier 312 has a top opening 324, end walls 326, sidewalls 328, handles 330 and 331, and a rim 332. Handles 330 may be made of any suitable material including plastic or metal. Handles 330 are pivotally attached to rim 332. Handles 331 are similar to handles 230. Top tier 312 has a generally annular shape. End walls 326 and side walls 328 have a plurality of apertures 334. Apertures 334 are optional.

Collapsible wall section 314 has three principal generally annular tiers 340 and four living hinges 342. Living hinges 342a and 342d are located proximal to stiff or rigid tiers 312 and 316. Living hinges are 342b and 342c are located between tiers 340a and 340b and between tiers 340b and 340c, respectively. Tiers 340 are substantially vertical when basket 310 is substantially upright. Tiers 340 have a sloping top surface 344, a sloping bottom surface 346, exterior surfaces 348, and interior surfaces 350. Collapsible wall section 314 is substantially similar to wall sections 114 and 214.

Lower tier 316 has a generally annular portion 356 and a bottom portion 358. Annular portion 356 has two opposed sidewalls 360 and two opposed end walls 362. Bottom portion 358 has feet 364, which may include a soft plastic or elastomeric covering. Apart from the covering, lower tier 316 may be unitary having been made in a single molding operation.

Figure 39:
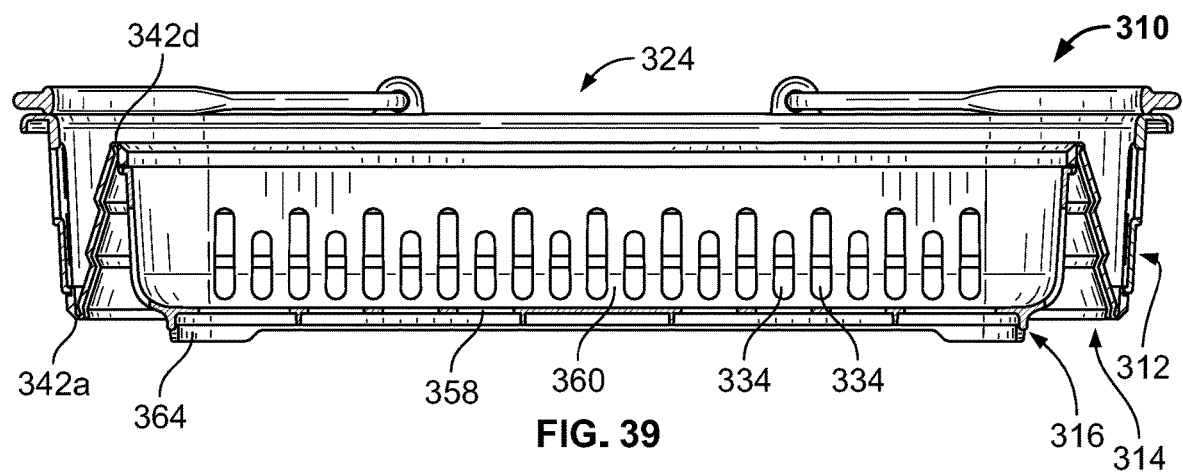
FIG. 39 is a cross-sectional elevation view along line 39-39 of FIG. 34 of the collapsible container depicted in FIG. 34 in a fully collapsed state.
Figure 40:
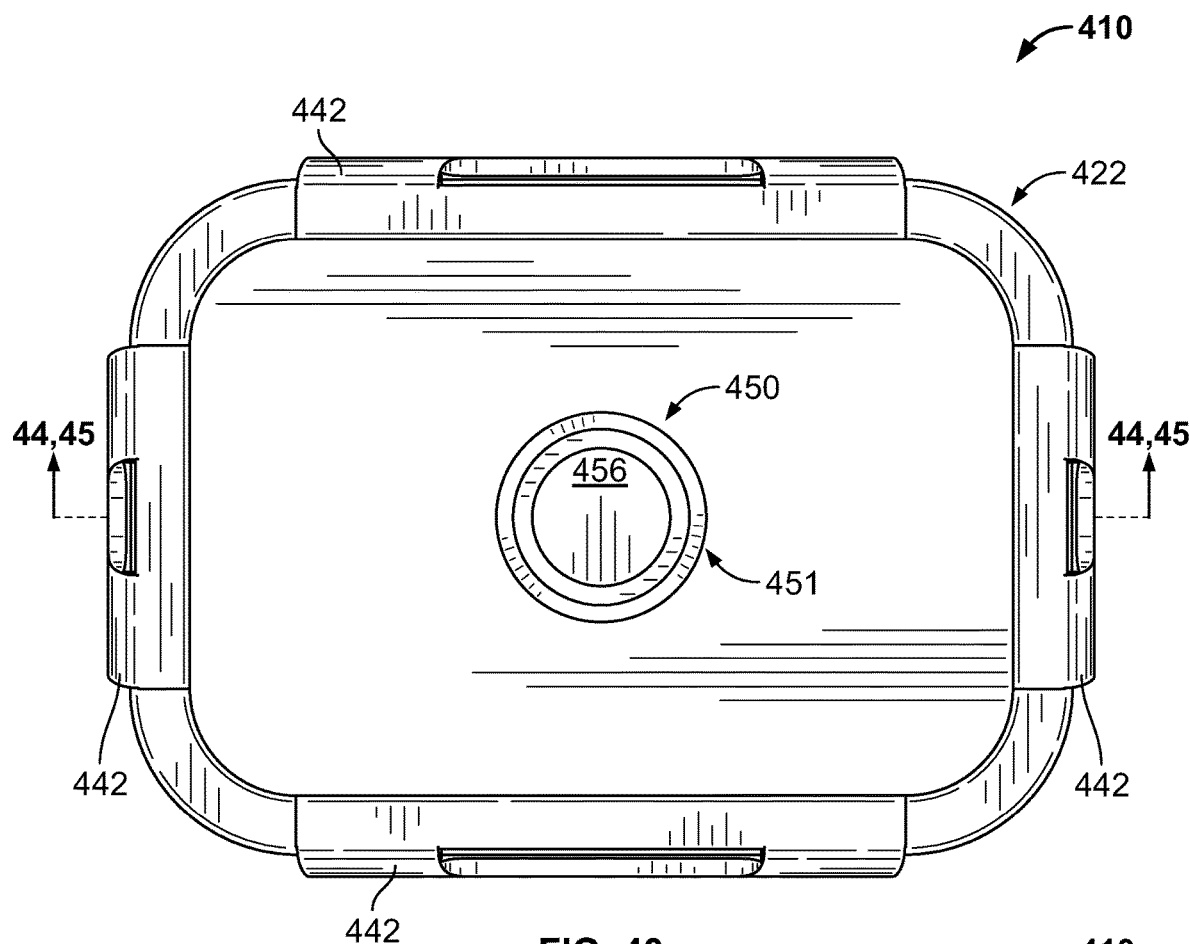
FIG. 40 is top plan view of a collapsible food container in a fully expanded state according to a fifth embodiment of the invention.
Figure 41:
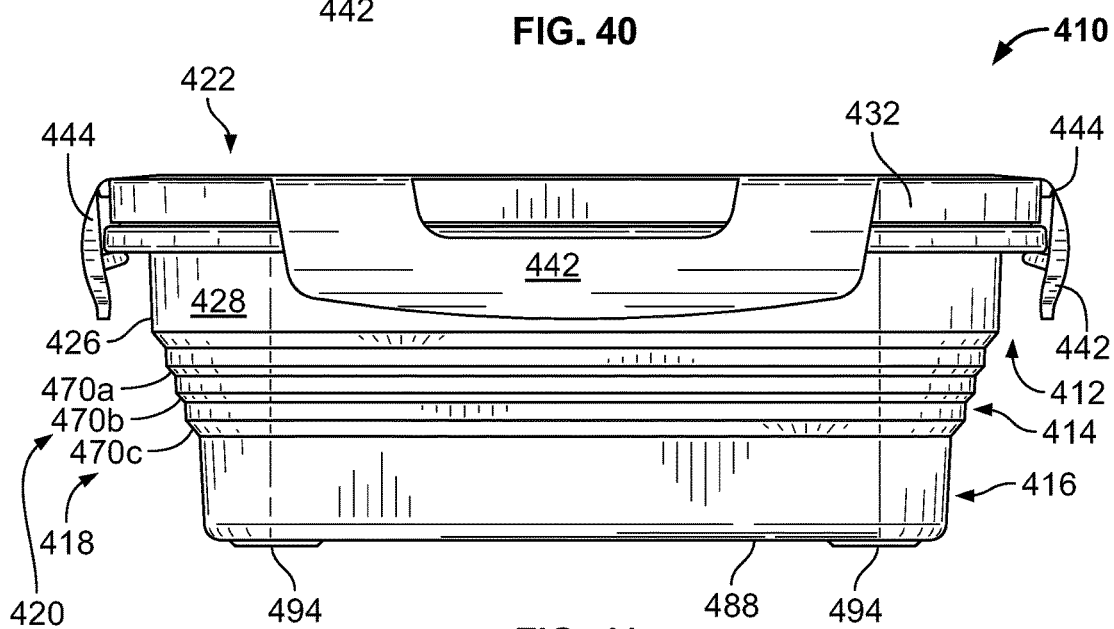
FIG. 41 is a side elevation view of the collapsible container depicted in FIG. 40.
Figure 42:
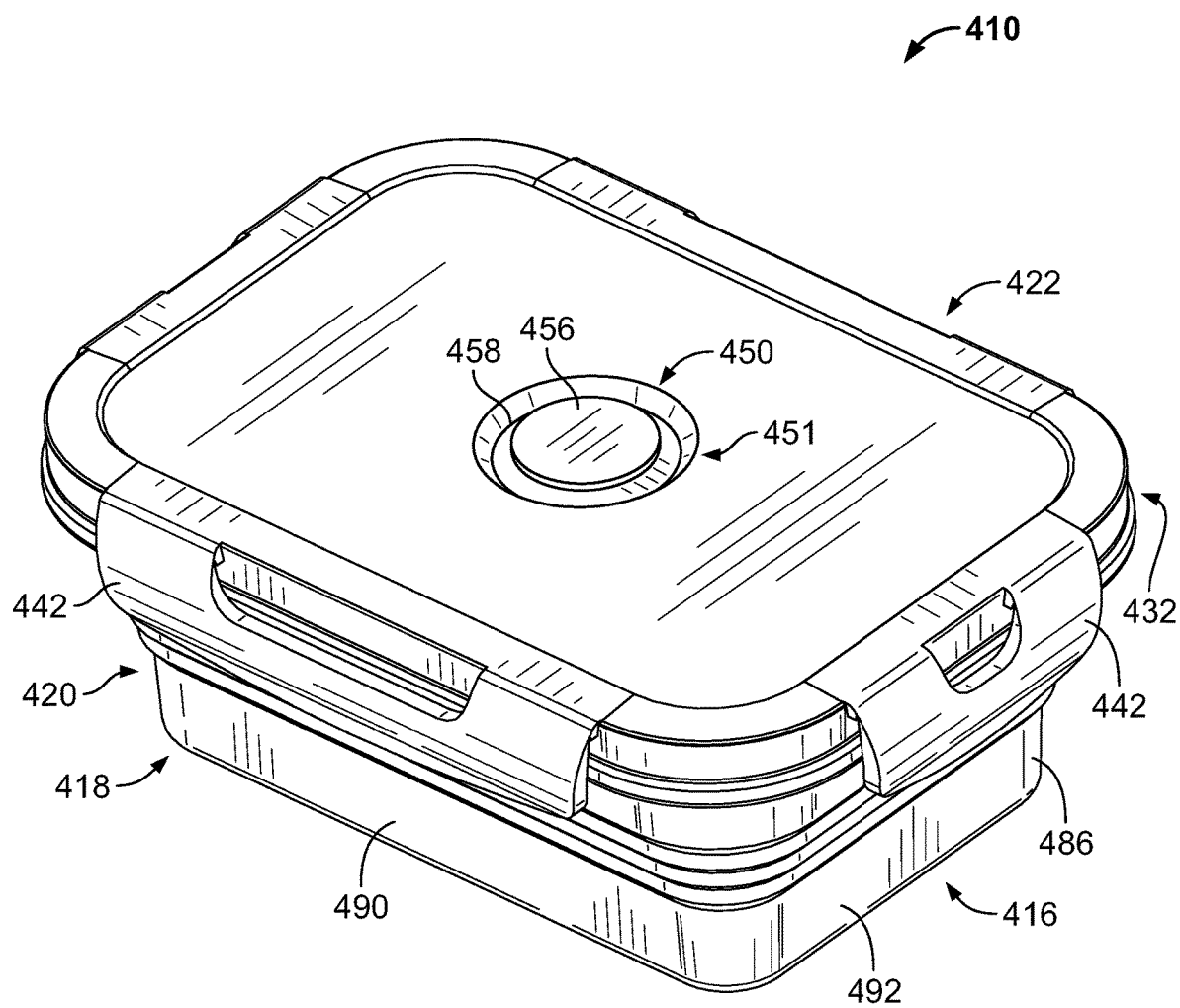
FIG. 42 is a perspective view of the collapsible container depicted in FIG. 40.
Figure 43:
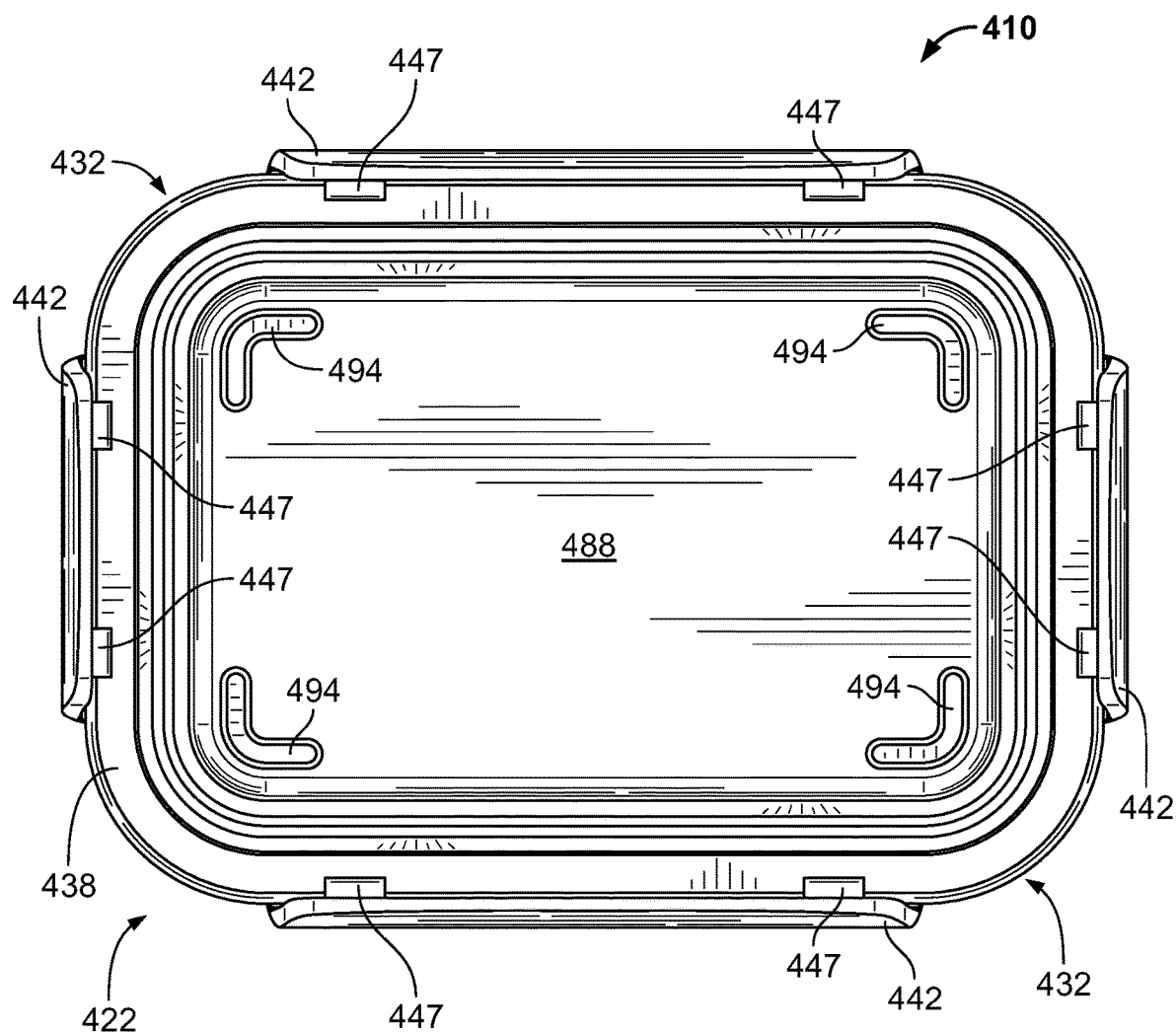
FIG. 43 is a bottom plan view of the collapsible container depicted in FIG. 40.
Figure 46:
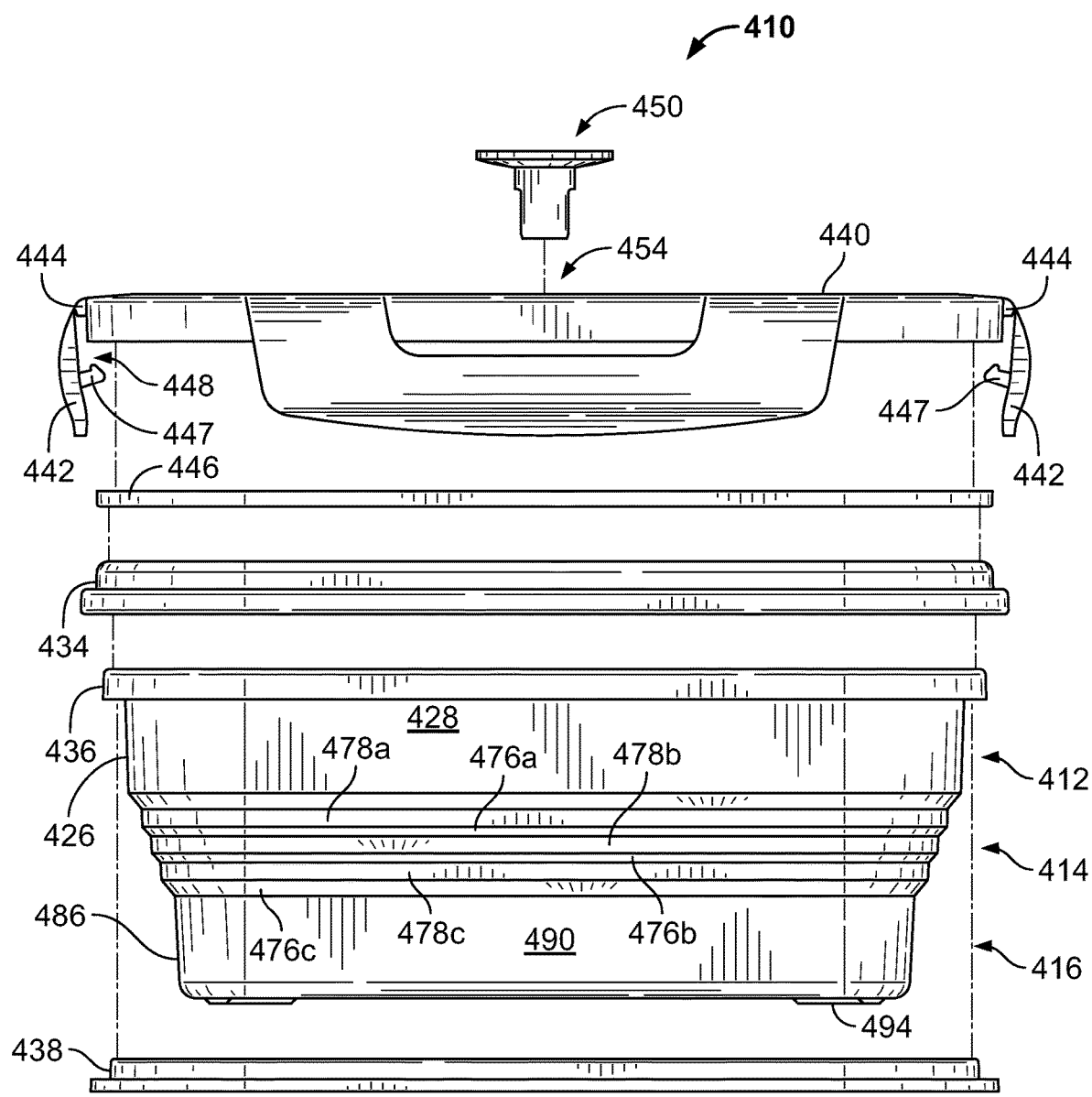
FIG. 46 is an exploded side elevation view of the collapsible container depicted in FIG. 40.
Figure 47:
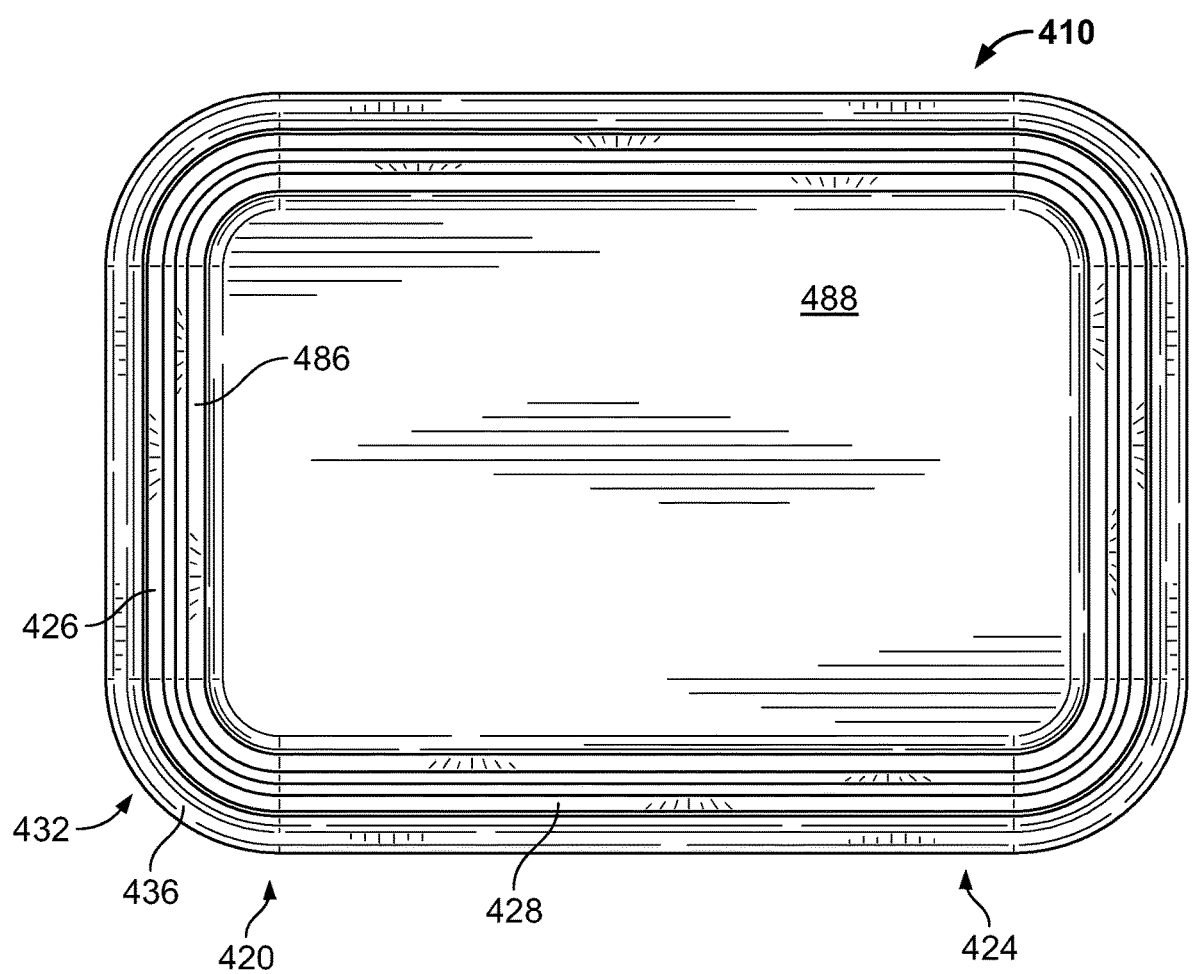
FIG. 47 is a top plan view of view of the collapsible container depicted in FIG. 40 without a lid.

Basket 310 is illustrated in two stable states or configurations. A fully expanded basket 310 (height of about 260 mm, length of about 500 mm and width of about 420 mm) is illustrated in FIGS. 34-38 showing living hinges 342 in their substantially unfolded configurations. FIG. 39 shows a fully collapsed state (basket height of about 120 mm, a reduction of about 60%) in which living hinges 342a and 342d are folded. Additionally basket 310 has partially collapsed states that are the same as tub 210.

With reference to FIGS. 40-47, collapsible and microwavable food container 410 is illustrated as a multi-tiered container including a stiff or rigid upper tier 412 (sometimes described herein as top tier 412), a collapsible wall section 414, and a stiff or rigid lower tier 416. Tiers 412 and 416 and collapsible wall section 414 combine to form a container shell 418. Container shell 418 includes a container body 420 and a removable lid 422. Container body 420 may be made from an elastomeric material such as silicone as illustrated and may be made in a single molding operation.

Top tier 412 has a top opening 424, end walls 426, sidewalls 428, a rim 432 and removable lid 422. Top tier 412 has a generally annular shape. Rim 432 has three components, a rigid top component 434, a stiff middle component 436, and a rigid bottom component 438. Rigid top component 434 and rigid bottom component 438 provide rigidity to rim 432, which is missing from middle component 436 if it is made of an elastomeric material. Middle component 436 may be part of container body 420 and made with body 420 in a single molding operation. Rim components 434 and 438 form a rigid hook 439 on the underside of rim 432 and may be joined to middle component 436 by any suitable method including ultrasonic welding, overmolding and adhesives, but preferably not. Alternatively, rim component 438 forms rigid hook 439 without rim component 434. Indeed, rim component 438 may provide sufficient rigidity to rim 432 that rim component 434 can be omitted. Lid 422 includes a lid body 440 peripheral flaps 442, living hinges 444, peripheral seal 446, cavity 448, vent 450 and recess 451. Peripheral flaps 442 are connected to lid body 440 by living hinges 444. Flaps 442 have one or more pronged hooks 447 for engaging hook 439 to secure lid 422 over opening 424. Seal 446 is preferably made of an elastomeric material and is housed inside cavity 448. Seal 446 preferably has a plurality of fingers 452 extending towards rim 432. Vent 450 has an opening 454 and a plug 456. Plug 456 has a handle 458, a stepped cylindrical body 460, and a hollow end 462. Body 460 has a first tier 464 for blocking opening 454 and a second tier 466 for partially opening vent 450. End 462 may be pronged or hooked to removably retain plug 456 within opening 454. Vent 450 allows the contents of container 410 to be microwaved and to allow steam to escape while lid 422 is secured over opening 424.

Collapsible wall section 414 has three principal generally annular tiers 470 and four living hinges 472. Living hinges 472a and 472d are located proximal to stiff or rigid tiers 412 and 416. Living hinges are 472b and 472c are located between tiers 470a and 470b and between tiers 470b and 470c, respectively. Tiers 470 are substantially vertical when container 410 is substantially upright. Tiers 470 have a sloping top surface 474, a sloping bottom surface 476, exterior surfaces 478, and interior surfaces 480. Collapsible wall section 414 is substantially similar to wall sections 114 and 214.

Lower tier 416 has a generally annular portion 486 and a bottom portion 488. Annular portion 486 has two opposed sidewalls 490 and two opposed end walls 492. Bottom portion 488 has a plurality of feet 494.

Container 410 is illustrated in two stable states or configurations. A fully expanded container 410 (about 65 mm high with lid, 180 mm long and 130 mm wide) is illustrated in FIGS. 40-44, 46 and 47 showing living hinges 472 in their substantially unfolded configurations. FIG. 45 shows a fully collapsed state (container 410 is about 32 mm high with lid, a reduction in height of about 50% from the fully expanded height) in which living hinges 472a and 472d are folded. Additionally container 410 has partially collapsed states that are the same as tub 210.

A preferred method of manufacturing collapsible containers is now discussed. A stiff or rigid first tier of a first material is made, by any suitable method. A stiff or rigid second tier of a second material is made, by any suitable method. The first and second tiers may correspond to a top, middle or bottom tier of any of the containers discussed herein. Both the first and second material may be the same or different and may be polypropylene or metal, for example. If the first or second material is plastic then the respective first and/or second tier is preferably made by injection molding. The first and second tiers are put into a first mold and a collapsible wall section is overmolded over end portions of the first and second tiers in the first mold to form a container body including the first and second tiers and the collapsible wall section between the two tiers. The collapsible wall section may have three generally annular tiers. It may correspond to any of the collapsible wall sections discussed herein. One end of the container body has a male or female member. The container body is then placed in the second mold. A container component having a female or male member opposed to the male or female member of the container body are assembled together in the second mold, which includes mating the male and female members together. The container body may be fully collapsed in the second mold before the assembly. The second mold is closed. Next a thermoplastic elastomer layer is overmolded over at least a portion of the exterior of the combined male and female members and over and in contact with at least a portion of the container body and the container component. The thermoplastic elastomer layer is in tension after the overmolding and thereby holds the container component and the container body together. The method herein is applicable to the manufacture of collapsible containers generally and particularly to containers 10 and 110, whose elastomeric layer 61 and 160 may be overmolded in accordance with this method. The collapsible containers of the invention can provide a height reduction from the fully erect or extended position to the fully collapsed state of, for example, 50%, 66%, 70% or more.

Of course, in the context of containers according to the present invention, it will be understood that "stiff," "rigid," and "flexible" are relative terms. Thus, unless further specified, referring to a tier of a wall structure as "stiff" herein simply means, at a minimum, that the tier is stiff enough to impart a force to its neighboring flexible tier or tiers sufficient to fold the flexible tier or tiers between relatively folded and unfolded stable positions (optionally causing the flexible tiers to "snap" between positions), without itself folding (i.e., without inverting its vertical orientation, with respect to the top and bottom of the container). On the other hand, a tier that is considered "rigid" for purposes of the invention typically will not even appreciably yield or deform, let alone fold, in the direction of the force imparted to fold the flexible tiers, in response to either that force or other typical loads associated with normal use of the container. Still further, a rigid tier preferably will not appreciably deform in any direction during normal use of the container. A "rigid" tier that exhibits the latter characteristic of not appreciably deforming in any direction is typically formed of a different material than the flexible tiers, rather than the same material in a different size or geometric configuration.

Although each flexible tier of the various containers described herein is illustrated as having only two stable positions, it is also within the scope of the invention to provide one or more flexible tiers having a plurality of stable partially expanded positions, for example by providing one or more flexible tiers having a stepped profile comprising a series of accordion-like pleats of flexible material, the pleats comprising peripheral bands of material oriented in alternating directions and connected to adjacent bands by living hinges, so that each pleat can be independently folded and unfolded (not shown), being stable in either state. Also, a wall structure of a container according to the invention need not have the exact shapes of the containers shown in the Figures, but may have any suitable shape, such as round, oval, rectangular with rounded corners, or other shape as desired. For example, successive accordion pleats may be stable in relatively "bent" orientations, in which part of the circumferential length of a pleat is folded and the remainder of the length is unfolded.

Containers according to the invention may be constructed of any suitable materials that impart relative stiffness or rigidity to the top tier, middle tier, and bottom tier; and relative flexibility to the flexible tiers, while permitting the tiers to be durably attached to their neighboring tiers. For example, in the respective shells or bodies 18, 122, 222, 322 and 420 of the illustrated containers, the top tier; bottom tier, and/or middle tier may be rigid and composed of polypropylene or other suitable material, the flexible tiers being a thermoplastic elastomer overmolded onto the polypropylene or other suitable material. Alternatively, the top tier, bottom tier, and/or middle tier may be rigid and composed of metal or nylon or other suitable material, the flexible tiers being a silicone material overmolded onto the metal or nylon or other suitable material with a suitable adhesive or glue between the two materials to strengthen their connection. Alternatively, the entire body of a container may be made of an elastomer including a thermoplastic elastomer or silicone and the walls of the top and bottom tiers are thicker than the walls of the collapsible wall sections. Tiers and collapsible wall sections may be connected to each other by any suitable method including overmolding, ultrasonic welding or adhesive connection. The connection may watertight if desirable. Lids and handles may be made of any suitable materials and may even be made of a plurality of materials.

In the respective insert containers, on the other hand, for which rigidity is less likely to be crucial (especially of the middle tier), considering that the rigidity of the non-folding tiers of the outer shell will protect the insert container and its contents, the middle tier may be merely stiff as opposed to rigid, and may be composed of the same resilient material as the flexible tiers, but simply thicker and/or more vertically aligned (i.e., less tapered or not tapered at all in its relaxed state) to resist folding under vertical compressive forces.

Moreover, the structural strength and shape retention provided by a rigid middle tier of a different material is only one of many advantages provided by indoor and outdoor containers of the present invention. Thus, where desired, components that are merely "stiff," and optionally made of the same material as the flexible tiers, but formed with shapes, alignments, and/or dimensions that resist folding, may be substituted in the place of "rigid" components of containers of the invention, not only in the inserts but even in the shells, while still retaining other advantages over existing containers.

In the context of containers according to the present invention, it will be understood that a living hinge is made of the same material as the stiff or rigid pieces it connects, Generally, the hinge is thinner than the surrounding material. Living hinges may be made of any suitable material permitting the hinge to be repeatedly folded and unfolded including polypropylene, silicone and thermoplastic elastomer.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A method of manufacturing a collapsible container having a container body having a stiff first tier, a stiff second tier, and a collapsible wall section connecting the stiff first tier to the stiff second tier and a matching container component, the method comprising:
   placing the container body comprising the stiff first tier, the stiff second tier, and the collapsible wall section in a mold;
   assembling the container body with the matching container component to close one end of the container body;
   placing the container component in the mold; and
   overmolding on the assembly of the container body and the container component in the mold a thermoplastic layer around at least a portion of the container body and around at least a portion of the container component to hold the assembly together, the thermoplastic layer not being part of the assembly before the overmolding.

2. The method of claim 1 further comprising collapsing the collapsible wall section to collapse the container body before overmolding, wherein the overmolding occurs on the collapsed container body.

3. The method of claim 1 further comprising forming the collapsible wall section with a plurality of circumferential wall sections and a plurality of circumferential lines of thinned material for living hinges between the circumferential wall sections.

4. The method of claim 1 further comprising overmolding the collapsible wall section onto the first tier and the second tier.

5. The method of claim 1 wherein assembling comprises mating a male member to a female member, the container body having one of the male member and the female member and the container component having the other of the male member and the female member.

6. The method of claim 1 wherein overmolding a thermoplastic layer comprises overmolding a thermoplastic elastomeric layer.

7. The method of claim 1 wherein the overmolding comprises permanently joining the container body and the container component.

8. The method of claim 1, wherein assembling comprises closing one end of the stiff second tier and overmolding comprises overmolding the thermoplastic layer around at least a portion of the stiff second tier.

9. The method of claim 1, wherein the container component comprises a stiff third tier, a stiff fourth tier, and a second collapsible wall section between the stiff third tier and the stiff fourth tier.

10. The method of claim 9, wherein assembling comprises mating the stiff second tier to the stiff third tier.

11. The method of claim 10, wherein the stiff second tier and the stiff third tier are made of polypropylene.

12. The method of claim 1, wherein the container component is a unitary base portion.

13. The method of claim 10, wherein the stiff second tier and the unitary base portion are made of polypropylene.

14. The method of claim 13, wherein assembling comprises mating the stiff second tier to the unitary base portion.

15. A method of manufacturing a collapsible container having a container body having a stiff first tier, a stiff second tier, and a collapsible wall section connecting the stiff first tier to the stiff second tier and a matching container component having a stiff polypropylene portion, the method comprising:
- placing the container body comprising the stiff first tier, the stiff second tier, and the collapsible wall section in a mold;
- assembling the stiff second tier of the container body with the stiff polypropylene portion of the matching container component to close one end of the container body;
- placing the container component in the mold; and
- overmolding on the assembly of the container body and the container component in the mold a thermoplastic layer around at least a portion of the container body and around at least a portion of the container component.

16. The method of claim 15 wherein assembling comprises mating a male member to a female member, the container body having one of the male member and the female member and the container component having the other of the male member and the female member.

\* \* \* \* \*